(12) United States Patent
Ito et al.

(10) Patent No.: US 7,545,722 B2
(45) Date of Patent: Jun. 9, 2009

(54) METHOD AND APPARATUS FOR OPTICALLY READING INFORMATION ATTACHED TO A TARGET

(75) Inventors: Kunihiko Ito, Chiryu (JP); Kenichi Yoshida, Nagoya (JP)

(73) Assignee: Denso Wave Incorporated, Tokyo (JP)

( * ) Notice: Subject to any disclaimer, the term of this patent is extended or adjusted under 35 U.S.C. 154(b) by 944 days.

(21) Appl. No.: 11/012,731

(22) Filed: Dec. 16, 2004

(65) Prior Publication Data

US 2005/0152229 A1 Jul. 14, 2005

(30) Foreign Application Priority Data

Dec. 18, 2003 (JP) .............................. 2003-420831
Nov. 11, 2004 (JP) .............................. 2004-327863

(51) Int. Cl.
*G11B 7/00* (2006.01)
*G06K 7/10* (2006.01)

(52) U.S. Cl. ............... 369/100; 235/462.07; 235/462.01

(58) Field of Classification Search ........................ None
See application file for complete search history.

(56) References Cited

U.S. PATENT DOCUMENTS 5,426,288 A 6/1995 Obata et al.
2003/0085284 A1* 5/2003 Bremer et al. .......... 235/462.32

FOREIGN PATENT DOCUMENTS

JP 5-181995 7/1993
JP 6-162249 6/1994
JP A-11-328296 11/1999
JP A-2000-105795 4/2000
JP A-2000-259760 9/2000
JP A-2002-056348 2/2002
JP A-2002-318994 10/2002

OTHER PUBLICATIONS

First Office Action from Chinese Patent Office issued on Oct. 13, 2006 for the corresponding Chinese patent application No. 2004100954872 (English translation thereof).
Office Action dated Feb. 26, 2008 in corresponding Japanese Patent Application No. 2004-327863 (and English translation).

* cited by examiner

*Primary Examiner*—Muhammad N. Edun
(74) *Attorney, Agent, or Firm*—Posz Law Group, PLC

(57) ABSTRACT

In an apparatus for optically reading out through an imaging optics a first image of information by a photodetector. The information is attached to a target. In the apparatus, a marker beam irradiating unit irradiates on a target a marker beam for indicating a field of view of the photodetector on the target. A first pickup unit causes the photodetector to pick up through the imaging optics a second image of the target based on the field of view while the marker beam is being irradiated on the target by the marker beam irradiating device. A position detecting unit detects a position of the marker beam being irradiated on the target with respect to the field of view based on the picked-up second image. A distance determining unit determines a distance between the apparatus and the target based on the detected position of the marker beam.

18 Claims, 15 Drawing Sheets

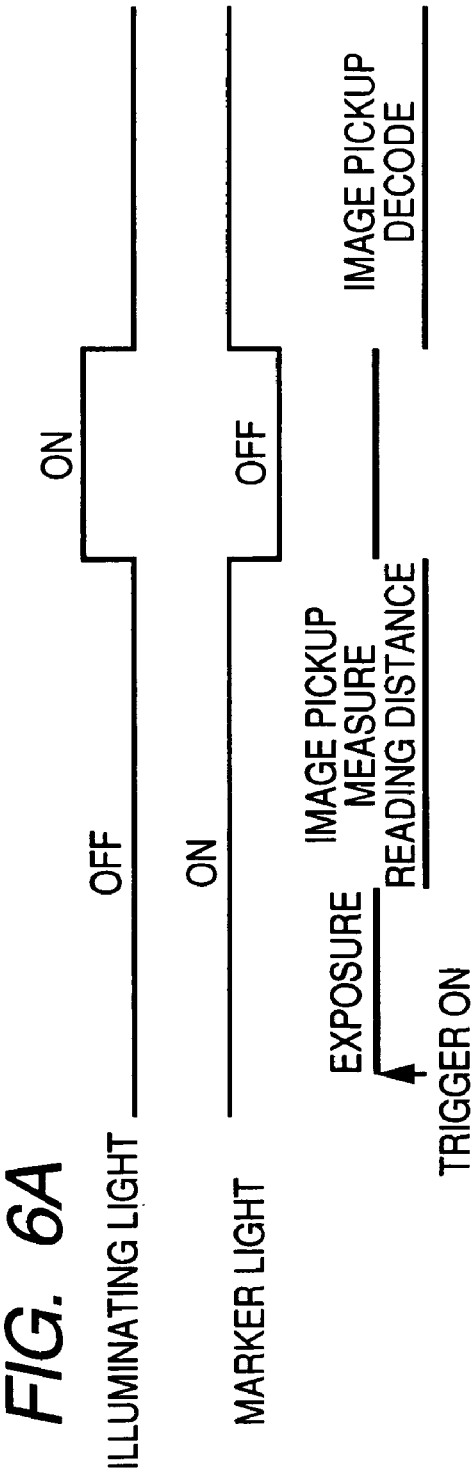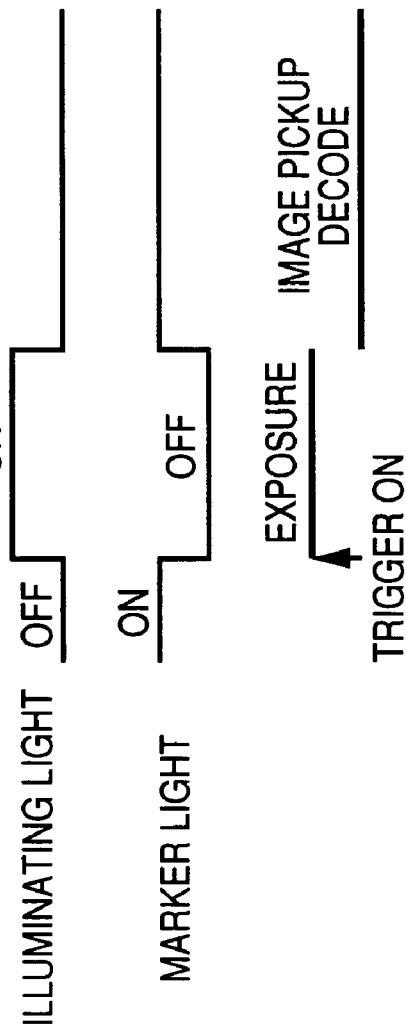

METHOD AND APPARATUS FOR OPTICALLY READING INFORMATION ATTACHED TO A TARGET

CROSS REFERENCE TO RELATED APPLICATION

This application is based on Japanese Patent Application 2003-420831 filed on Dec. 18, 2003 and Japanese Patent Application 2004-327863 filed on Nov. 11, 2004. This application claims the benefit of priority from each of the Japanese Patent Applications, so that the descriptions of which are all incorporated herein by reference.

BACKGROUND OF THE INVENTION

1. Field of the Invention

The present invention relates to a method and an apparatus for optically reading a target on which optically readable information, such as an information code, for example, a barcode or a two-dimensional code, is written.

2. Description of the Related Art

Handheld optical information readers aim at reading an information code that is optically readable, such as a barcode, a two-dimensional code, or other similar codes. In this specification, a target itself or a target to which optically readable information is attached is collectively referred to as "target".

For improving the handheld optical information readers, a type of handheld optical information readers that can read an information code positioned at a distance therefrom has been provided.

Such type of handheld optical information readers has a handheld body case provided at its one end portion with a reading window, a photodetector, such as a CCD (Charge-Coupled Device) area sensor, an imaging unit with an imaging lens, and a reading unit composed of a light illuminating device. The photodetector, the imaging unit, and the reading unit are installed in the body case, respectively.

In this type optical information reader, a user pushes a trigger switch attached to the handheld body case with the reading window of the handheld body case directed to a target, such as a barcode. The push of the trigger switch causes the light illuminating device to supply light through the reading window toward the target. The light supplied from the light illuminating device is irradiated to the target (barcode) so that light reflected from the target based on the irradiated light enters through the reading window into the imaging unit The light entered into the imaging unit is focused on the photodetector by the imaging lens to be imaged thereon, so that an image corresponding to the target is picked up by the photodetector.

In this type optical information reader, a certain range of a reading distance defined as a distance between the reading window and the target is previously determined depending on the relationship between an intensity of the irradiated light on the target and an exposure time of the photodetector. The determined range of the reading distance allows the reading apparatus to precisely read the target.

If the reading distance between the reading window and the target exceeds the determined range, the intensity of the irradiated light on the target would be insufficient, causing the need for repeat reading operations to arise.

For avoiding such repeat reading operations, conventional optical information readers each having means for measuring a reading distance between the reading window and a target in a noncontact manner have been well known.

First and second examples of the conventional optical information readers are disclosed in U.S. Pat. No. 5,426,288 corresponding to Japanese Unexamined Patent Publications No. H5-181995 and No. H6-162249.

The publication, as the first example, shows a barcode reader with a range sensor for measuring a distance between the reader and a target based on triangulation techniques. The barcode reader controls the diameter of a laser beam as an irradiated light on the target so that the diameter of the laser beam is appropriately set according to the target.

The publication, as the second embodiment, shows an optical information reader with means for measuring a period from which a laser beam is irradiated from the optical information reader toward a target to which a laser beam reflected from the target based on the irradiated laser beam is returned to the optical information reader. The optical information reader determines whether a reading distance between the reader and the target is within a predetermined range, which allows the optical information reader to precisely read the target, based on the measured period.

In the first example of the conventional optical information readers, the range sensor may be comparatively costly and may have a comparatively large size.

In the second example of the conventional optical information readers, because the velocity of the laser beam may be very fast, it may be difficult to precisely measure the period between the time of irradiation of the laser beam and the time of reception of the reflected laser beam.

SUMMARY OF THE INVENTION

The present invention is made on the background so that preferable embodiments of optical reading apparatuses of the present invention each is capable of making simple and compact a structure to determine a distance between each apparatus and a target.

The present invention is made on the background so that preferable embodiments of optical reading apparatuses of the present invention each is capable of reducing a time required for determining a distance between each apparatus and a target.

According to one aspect of the present invention, there is provided an apparatus for optically reading out through an imaging optics a first image of information by a photodetector. The information is attached to a target, the apparatus comprises a marker beam irradiating unit configured to irradiate on a target a marker beam for indicating a field of view of the photodetector on the target. In addition, a first pickup unit is configured to cause the photodetector to pick up through the imaging optics a second image of the target based on the field of view while the marker beam is being irradiated on the target by the marker beam irradiating device. A position detecting unit is configured to detect a position of the marker beam being irradiated on the target with respect to the field of view based on the picked-up second image. A distance determining unit is configured to determine a distance between the apparatus and the target based on the detected position of the marker beam.

According to another aspect of the present invention, there is provided a method of optically reading out a first image of information based on a predetermined field of view. The information is attached to a target. The method comprises irradiating on a target a marker beam for indicating the field of view on the target. In the method, a second image of the target based on the field of view, is picked up while the marker beam is being irradiated on the target by the irradiating. A position of the marker beam being irradiated on the target is detected with respect to the field of view based on the picked-up second image. A distance between the apparatus and the target is based on the detected position of the marker beam.

BRIEF DESCRIPTION OF THE DRAWINGS

Other objects and aspects of the invention will become apparent from the following description of embodiments with reference to the accompanying drawings in which:

FIG. 6A is a time chart illustrating on and off timings of the marker beam and illuminating light according to the first embodiment;

FIG. 6B is a time chart illustrating on and off timings of a marker beam and illuminating light of a conventional two-dimensional code reader for comparison;

DETAILED DESCRIPTION OF EMBODIMENTS OF THE INVENTION

Embodiments of the present invention will be described hereinafter with reference to the accompanying drawings. In the embodiments, the invention is applied to a gun-shaped two-dimensional code reader.

First Embodiment

Figure 1:
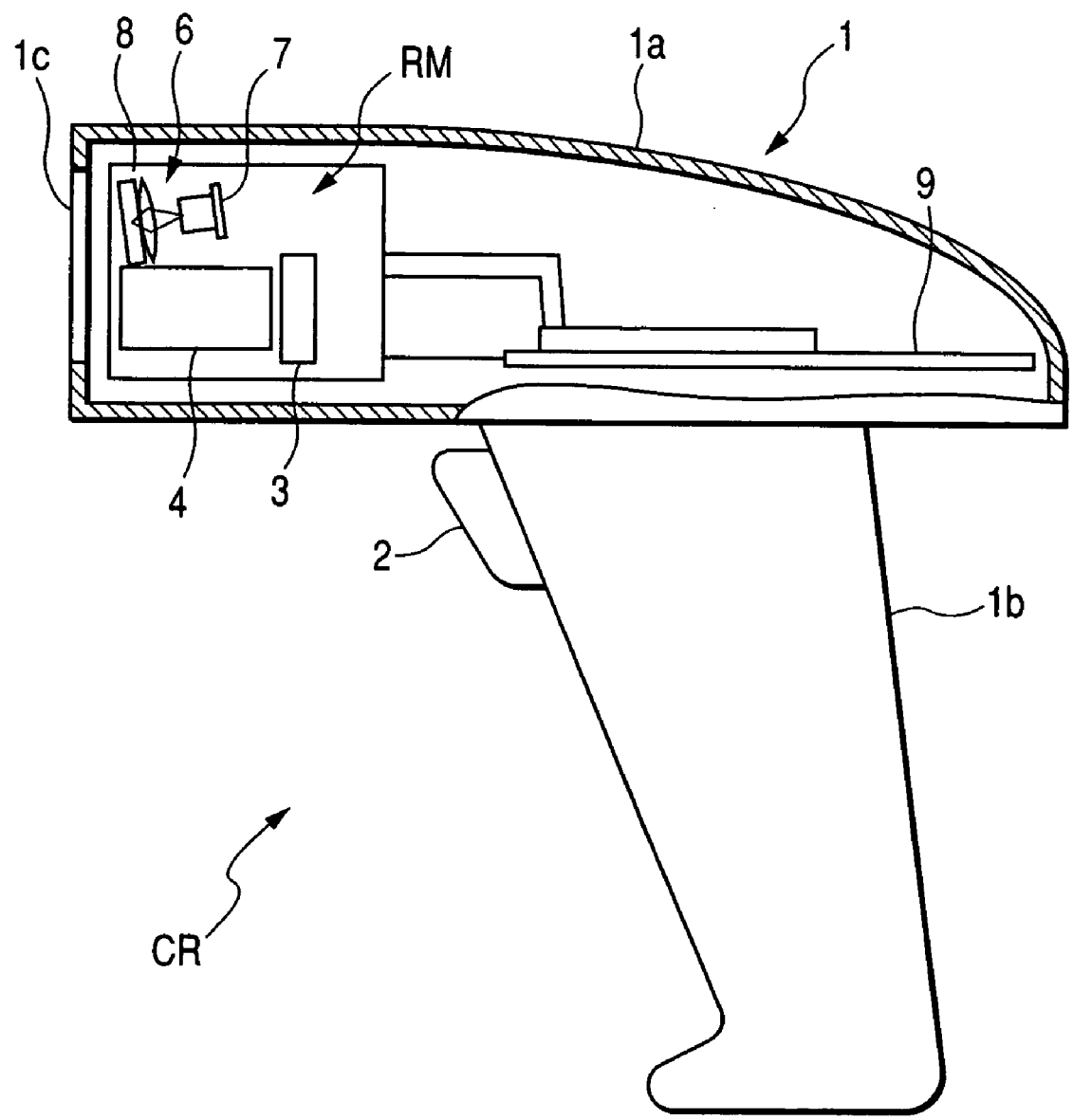
FIG. 1 is a partially cross sectional side view schematically illustrating a structure of a two-dimensional code reader according to a first embodiment of the present invention.
Figure 2:
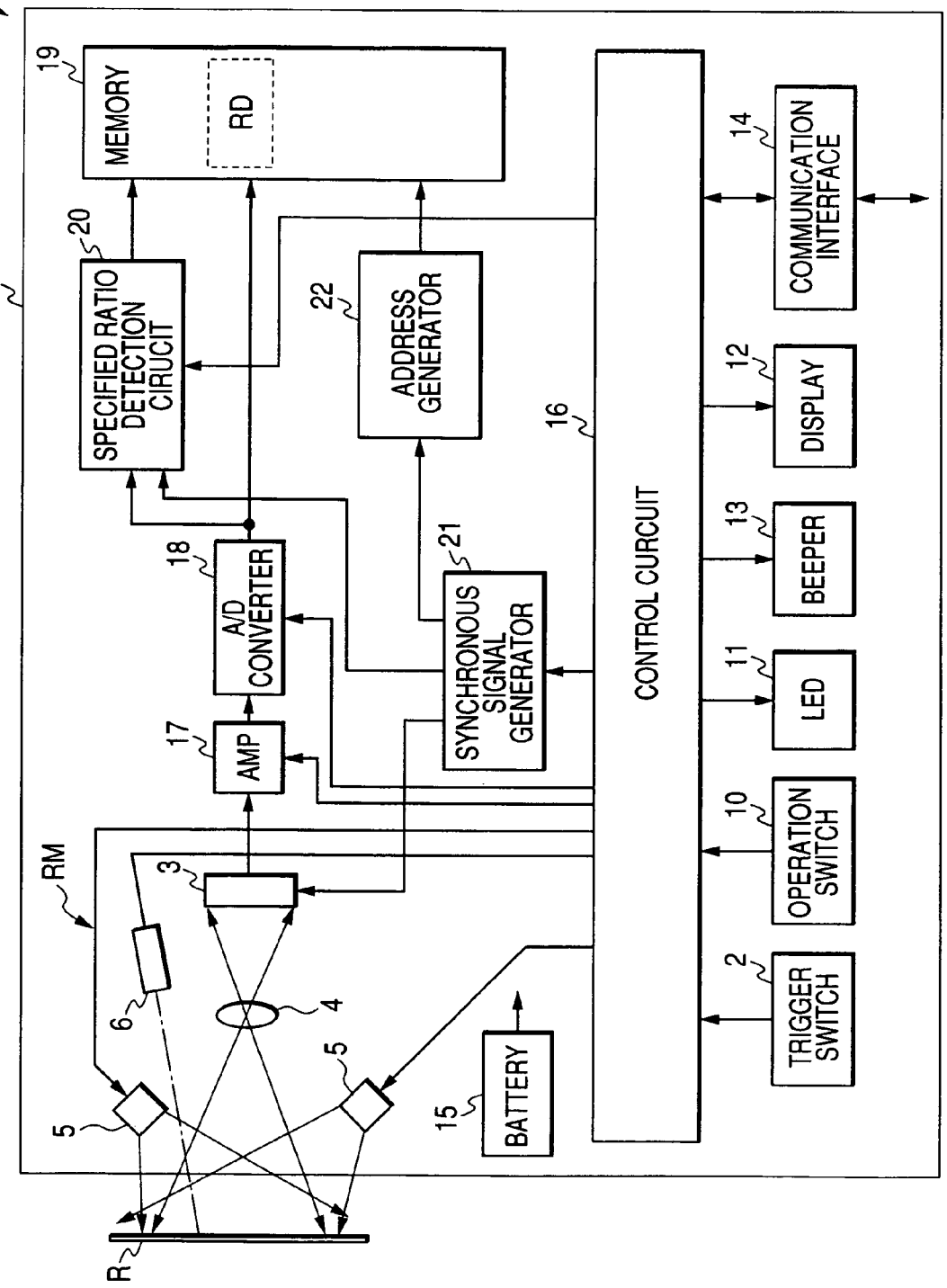
FIG. 2 is a block diagram schematically illustrating an electrical structure of the two-dimensional code reader according to the first embodiment.

FIG. 1 is a partially cross sectional side view schematically illustrating the structure of a gun-shaped two-dimensional code reader CR according to a first embodiment of the present invention; FIG. 2 is a block diagram schematically illustrating the electrical structure of the two-dimensional code reader CR according to the first embodiment.

As shown in FIG. 1, the two-dimensional code reader CR as an apparatus for optically reading a target according to a first embodiment of the present invention is provided with a gun-shaped housing 1. The gun-shaped housing 1 has, for example, a thin rectangular parallelepiped main body 1a. One lateral end portion of the main body 1a is rounded.

The gun-shaped housing 1 is provided at one side (specifically, bottom side in FIG. 1) of the one lateral end portion of the main body 1a with a grip portion 1b. The grip portion 1b is integrally formed to the main body 1a. The grip portion 1b allows a user to easily grip the two-dimensional code reader CR in one hand and handle it.

The main body 1a is formed at a lateral surface of the other lateral end portion with a reading window 1c having, for example, a rectangular shape and translucency. The two-dimensional code reader CR is also provided with a trigger switch 2. The trigger switch 2 is disposed to one side surface of the grip portion 1b; directed to the reading window 1c. The trigger switch 2 permits a user to instruct a reading operation to the two-dimensional code reader CR.

The two-dimensional code reader CR is provided with a reading mechanism (optical reading mechanism) RM disposed in the other lateral end portion of the housing 1. In the first embodiment, the other lateral end portion of the housing 1 is referred to as "head portion".

The reading mechanism RM is operative to read a two-dimensional code Q, such as a QR (Quick Response) code, written on a target R (see FIGS. 2 and 3) by printing or other similar methods. The target R includes a label that is a piece of paper or another media. The target R can be attached on goods, which is the same as general barcodes. The two-dimensional code Q includes information, such as, a manufactures serial number, a name, a unique identification number and a date of manufacture of the goods.

In recent years, the target R includes the screen of a display, such as a liquid crystal display (LCD) in a computer terminal, such as a cellular phone or a PDA (Personal Digital Assistant); a two-dimensional code is displayed on the screen of the display.

For example, the two-dimensional code Q consists of different color cells, such as black or white cells arranged in a matrix to form specific patterns therein, thereby indicating data. One of the black and white colors corresponds to one of bit values "0" and "1", and the other of the black and white colors to the other of bit values "0" and "1". After reading the cells, it is possible to digitize easily the read color data to decode it.

As schematically illustrated in FIGS. 1 to 3, the reading mechanism RM includes a photodetector 3, an imaging lens 4 constituting an imaging optics, and a pair of light illuminating devices 5, which is not shown in FIG. 3). The reading mechanism RM also includes a marker beam irradiating device 6 for marking the location of the field of view F of the photodetector 3 and/or the center of the field of view F.

The photodetector 3 is composed of, for example, a CCD area sensor. The photodetector 3 is located at the center of the head portion of the main body 1a. The photodetector 3 has an active area (light sensitive pixel area) composed of pixels arranged in matrix. The photodetector 3 also has a predetermined optical axis The photodetector 3 is arranged so that its pixel area is parallely opposite to the reading window 1c of the main body 1a and its optical axis passes through the center of the reading window 1c. The exposure time, that is, the shutter speed of the photodetector 3, can be externally controlled.

The imaging lens 4 has a body tube and a plurality of lens elements that are disposed coaxially therein. The imaging lens 4 has a total predetermined optical axis. The imaging lens 4 is arranged so that its total optical axis O (see FIG. 3A) extends orthogonally with the head end surface, which is formed with the reading window 1c, of the main body 1a. That is, the reading window 1c, the photodetector 3 and the imaging lens 4 are coaxially arranged with one another in the main body 1a.

Figure 3A:
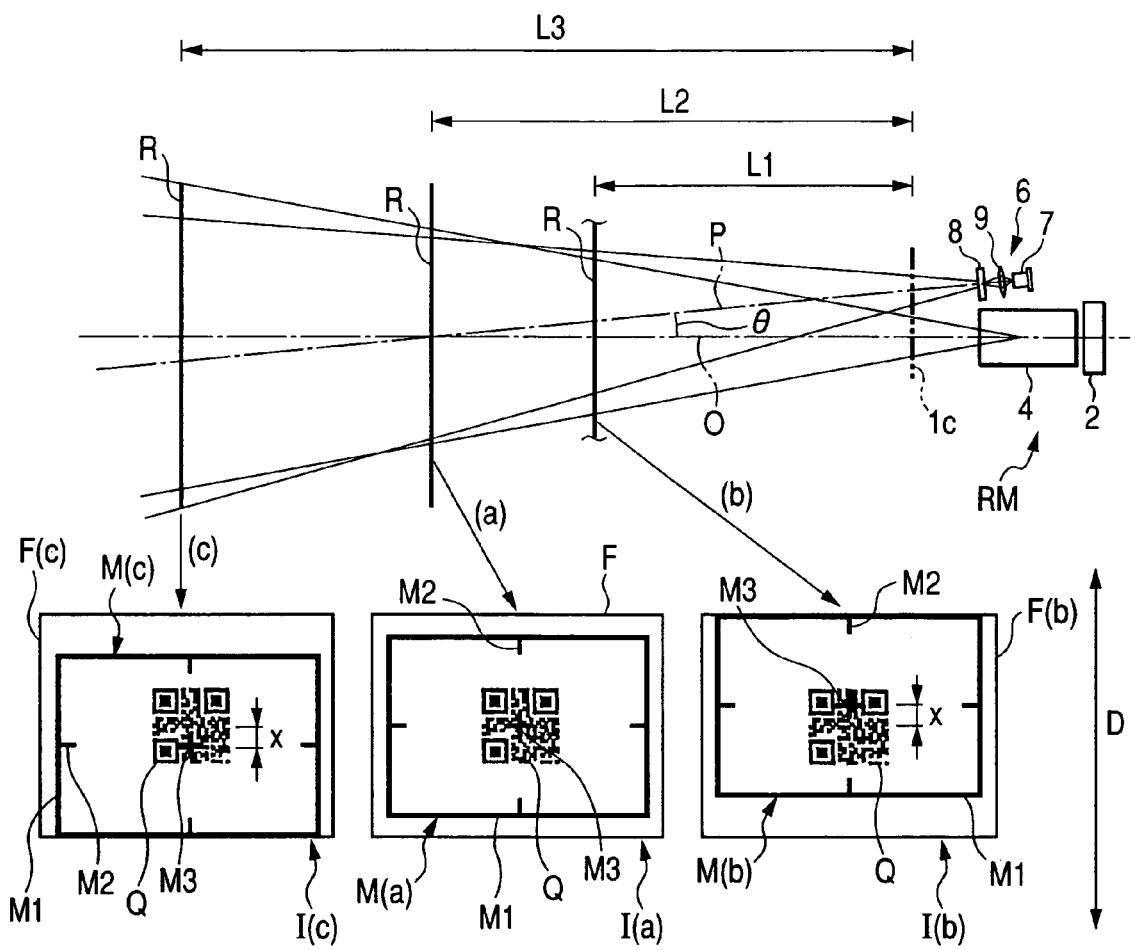
FIG. 3A is a view schematically illustrating a reading mechanism shown in FIGS. 1 and 2 according to the first embodiment.

Each of the light illuminating devices 5 is disposed around the imaging lens 4 except for one radial side, specifically top side, thereof (see FIG. 3A). That is, each of the light illuminating devices 5 is provided with a light emitting device (LED) serving as a light source. Each of the light illuminating devices 5 is also provided with a light lens disposed between each light emitting device and the reading window 1c. An optical axis of each light lens is directed to the reading window 1c so that each light lens is operative to collect and diffuse light emitted from each light emitting device through the reading window 1c.

That is, when the reading window 1c of the code reader CR is positioned to be opposite to the target R on which the two-dimensional code Q is written, illuminating light emitted from each of the light illuminating devices 5 is irradiated through the reading window 1c to the two-dimensional code Q. Light reflected from the two dimensional code Q is entered through the reading window 1c into the imaging lens 4. The reflected light entered into the imaging lens 4 is focused on the pixel area of the photodetector 3 by the imaging lens 4, so that an image corresponding to the target R is picked up by the photodetector 3.

The marker beam irradiating device 6, as shown in FIG. 3A, is disposed around the imaging lens 4. For example, the marker beam irradiating device 6 is disposed to the one radial side (top side) of the imaging lens 4 so that each of the light illuminating device 5 and the marker beam irradiating device 6 are positionally free from each other.

The marker beam irradiating device 6 is provided with a laser diode 7 whose optical axis P passes through the center of the reading window 1c. The marker beam irradiating device 6 is also provided with a hologram 8 disposed between the laser diode 7 and the reading window 1c so that the hologram 8 and the laser diode 7 are coaxially arranged with each other, The marker beam irradiating device 6 is also provided with a condenser lens 9 coaxially disposed between the laser diode 7 and the hologram 8.

The laser diode 7 is operative to irradiate a laser beam so that the irradiated laser beam is focused on the hologram 8 by the condenser lens 9. The laser beam is split by the hologram 8 so that a marker beam M consisting of split beam components is irradiated on the target R.

Figure 3B:
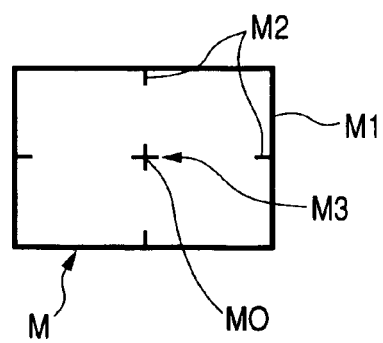
FIG. 3B is a view schematically illustrating marker beam components of a marker beam shown in FIG. 3A according to the first embodiment.

Specifically, in the first embodiment, as shown in FIGS. 3A and 3B, the marker beam M consists of a frame-shaped rectangular beam component (first beam component) M1, four linear beam components (second beam component) M2, and a cross beam component (third beam component) M3. Each second beam component M2 extends from each side of the first beam component M1. The third beam component M3 is arranged at the center of the first beam component M1. The irradiated area of the first beam component M1 on the target R is slightly smaller than the field of view F of the photodetector 3.

In addition, as shown in FIG. 3A, the optical axis P of the marker beam irradiating device 6, that is, the optical axis P of the marker beam M is designed to cross with the optical axis O of the imaging lens 4 (the photodetector 3) at a minute angle θ.

The crossing of the optical axis P of the marker beam M with respect to the optical axis O of the imaging lens 4 allows the irradiation position of the marker beam M on the target R to vary along the direction D depending on the change of the reading distance L between the target R and the reading window 1c of the housing 1. Specifically, the variation direction D of the irradiation position of the marker beam M is parallel to the orientation direction (specifically, top-to-bottom direction in FIG. 3A) between the marker beam irradiating device 6 and the imaging lens 4.

That is, when the code reader CR is arranged so that a value of the reading distance L between the reading window 1c and the target R is L2, for example, 200 mm (in a first state (a) in FIG. 3A), the marker beam M is irradiated on the center portion of the field of view F (see reference character M(a) in FIG. 3A).

When the code reader CR is arranged so that a value of the reading distance L between the reading window 1c and the target R is L1 shorter than the distance L2, for example, 100 mm (in a second state (b) in FIG. 3A), the marker beam M is irradiated to shift to one side of the field of view F along the direction D (see reference character M(b) in FIG. 3A).

When the code reader CR is arranged so that a value of the reading distance L between the reading window 1c and the target R is L3 longer than the distance L2, for example, 300 mm (in a third state (c) in FIG. 3A), the marker beam M is irradiated to shift to the other side of the field of view F along the direction D (see reference character M(c) in FIG. 3A).

Incidentally, in FIG. 3A, three types of images I(a), I(b), and I(c) corresponding to three reading distances L2, L1, and L3 are schematically illustrated, respectively. For convenience of explanation, in the images I(a) to I(c), the field of views F(a) to F(c) have the same size, respectively. In addition, for convenience of explanation, the two-dimensional code Q is centered in the field of views F(a) to F(c) of the images (a) to (c).

In the first embodiment, the marker beam irradiating device 6 is configured to continuously irradiate the marker beam M except when reading out the target R (two-dimensional code Q) by the photodetector 3.

As shown in FIG. 1, the two-dimensional code reader CR is provided with a circuit board 9 disposed in the main body 1a at its one end side, specifically backside opposite to the head side. In the circuit board 9, electrical components of the code reader CR are installed (see FIG. 2). As illustrated in only FIG. 2, the two-dimensional code reader CR is provided with an operation switch 10, an LED (light emitting device) 11, a liquid crystal display 12, a beeper 13, and a communication interface 14, which are disposed to the other side of the one lateral end portion of the main body 1a, respectively. The operation switch 10 allows a user to input various instructions to the code reader CR. The LED 11 is operative to visually indicate information to send notice to a user. The beeper 13 is operative to emit a series of beeps to send notice to a user. The communication interface 14 allows the code reader CR to communicate with external devices.

On the other hand, the two-dimensional code reader CR is provided with a battery 15 as a power supply for activating the above optical devices 3, 5, 6, the electrical components installed in the circuit board 9, and the above I/O devices 2, 10-14, respectively.

As shown in FIG. 2, in the circuit board 9, a control circuit 16 composed of at least one microcomputer {a CPU (Central Processing Unit), an internal memory unit including a ROM (Read Only Memory), a RAM (Random Access Memory) and the like, and peripherals} is provided. The control circuit 16 operates based on power supplied from the battery 15. The control circuit 16 operates in accordance with a program stored in the ROM to control the whole of the two-dimensional code reader CR and to perform decoding processes and other processes. The program can be loaded from a signal bearing media to the ROM. Examples of suitable signal bearing media include recordable type media such as floppy disks and CD (Compact Disk)-ROM, and transmission type media such as digital and analog communications links.

The control circuit 16 is communicably coupled to the trigger switch 2 and the operation switch 10 so that the commands sent from the switches 2 and 10 are inputted to the control circuit 16. The control circuit 16 is communicably coupled to the photodetector 3, the light illuminating devices 5, and the marker beam irradiating device 6, respectively, That is, the control circuit 16 operates to control the photodetector 3, the light illuminating devices 5, and the marker beam irradiating device 6 to execute reading processes of the two-dimensional code Q written on the target R. The control circuit 16 is also communicably coupled to the LED 11, the beeper 13, and the liquid crystal display 12 to control them. Moreover, the control circuit 16 is communicably coupled to the communication interface 14 to communicate with external devices through the communication interface 14.

Specifically, the control circuit 16 is operative to control the exposure time (the shutter speed) of the photodetector 3.

Furthermore, in the circuit board 9, an amplifier (AMP) 17, an analog to digital (A/D) converter 18, a memory 19, a specified-ratio detection circuit 20, a synchronous signal generator 21, and an address generator 22 are installed so that they are communicably coupled to the control circuit 16, respectively.

The amplifier 17 is electrically connected to the photodetector 3 and operative to amplify an image signal sequentially outputted from the photodetector 3 at a gain based on a gain control signal transmitted from the control circuit 16. The A/D converter 18 is electrically connected to the amplifier 17 and operative to convert the amplified image signal into digital image data {light intensity data (pixel data) of each pixel of the light sensitive pixel area of the photodetector}.

The synchronous signal generator 21, for example, periodically generates a synchronous signal to periodically output it to the photodetector 3, the specified ratio detection circuit 20, and the address generator 22 under the control of the control circuit 16.

The address generator 22 periodically counts a number of the transmitted synchronous signals to generate address signals in response to the count result, thereby outputting the address signals to the memory 19.

That is, the image data sequentially sent from the A/D converter 18 is stored in the memory 19 so as to correspond to the outputted address signals. The specified-ratio detection circuit 20 is operative to detect the specified patterns (bit patterns) in the image data in response to the synchronous signals based on the control of the control circuit 16 so that the control circuit 16 and the specified-ratio detection circuit 20 decode the image data (two-dimensional code Q).

Specifically, in the first embodiment, the control circuit 16 operates to cause the marker beam irradiating device 6, the photodetector 3, and the like to pick up an image (marker beam image) of the target R on which the marker beam M is being irradiated. In addition, the control circuit 16 operates to detect the irradiated position of the marker beam M from the picked-up image, thereby determining the reading distance L between the target R and the reading window 1c.

The control circuit 16, therefore, in the first embodiment, serves as a first pickup unit, a position detecting unit, and a distance determining unit.

In the first embodiment, for example, the marker beam M has been irradiated by the marker beam irradiating device 6 in power-on state of the code reader CR. During the irradiation of the marker beam M, when the trigger switch 2 is turned on, the image (marker beam image) of the target on which the marker beam M is being irradiated with the light illuminating devices 5 kept off is picked up by the photodetector 3. After the image pickup operation, while the marker beam irradiating device 6 is kept off, the light illuminating devices 5 are turned on so that the image of the two-dimensional code Q in the target R is picked up by the photodetector 3. That is, two-step image pickup operation is executed.

When the marker beam image is picked up by the photodetector 3 in the first image pickup step, the position of the marker beam M in the field of view F is detected by the control circuit 16 based on the picked-up marker beam image.

Specifically, as the position of the marker beam M in the field of view F, a shift length x of the center position (center Mo of the third beam component M3) of the marker beam M with respect to the center of the field of view F is detected by the control circuit 16 based on the picked-up marker beam image. The reading distance L between the target R and the reading window 1c is determined based on the detected shift length.

In the first embodiment, a relationship between the shift length x of the center position Mo of the marker beam M with respect to the center of the field of view F and the reading distance L are measured with changes in the distance L one or more times at the setting of the factory. Data indicative of the relationship between each of the values of the distance L and each of the corresponding those of the shift length x is previously stored in the memory as "relationship data RD".

In the first embodiment, the control circuit 16 operates to control the exposure time (shutter speed) of the photodetector 3 depending on the determined reading distance L when picking up the image of the two-dimensional code in the second image pickup step. Specifically, in the first embodiment, the control circuit 16 is configured to control the exposure time of the photodetector 3 so that the farer the determined reading distance L is, the longer the exposure time. Still furthermore, in the first embodiment, it is assumed that the determined reading distance L is out of a previously determined range that suitable for reading the target R, for example, the determined reading distance L is too short to be out of the previously determined range or that is too long to be out of the range. In this assumption, the control circuit 16 is configured to control at least one of the beeper 13 and the crystal liquid display 12 to send a notice indicative of the reading distance L being outside of the previously determined range.

For example, the beeper 13 and/or the crystal liquid display 12 serve as a determining unit.

Next, the operations of the two-dimensional code reader CR according to the first embodiment will be described hereinafter in accordance with FIGS. 4-6.

Figure 4:
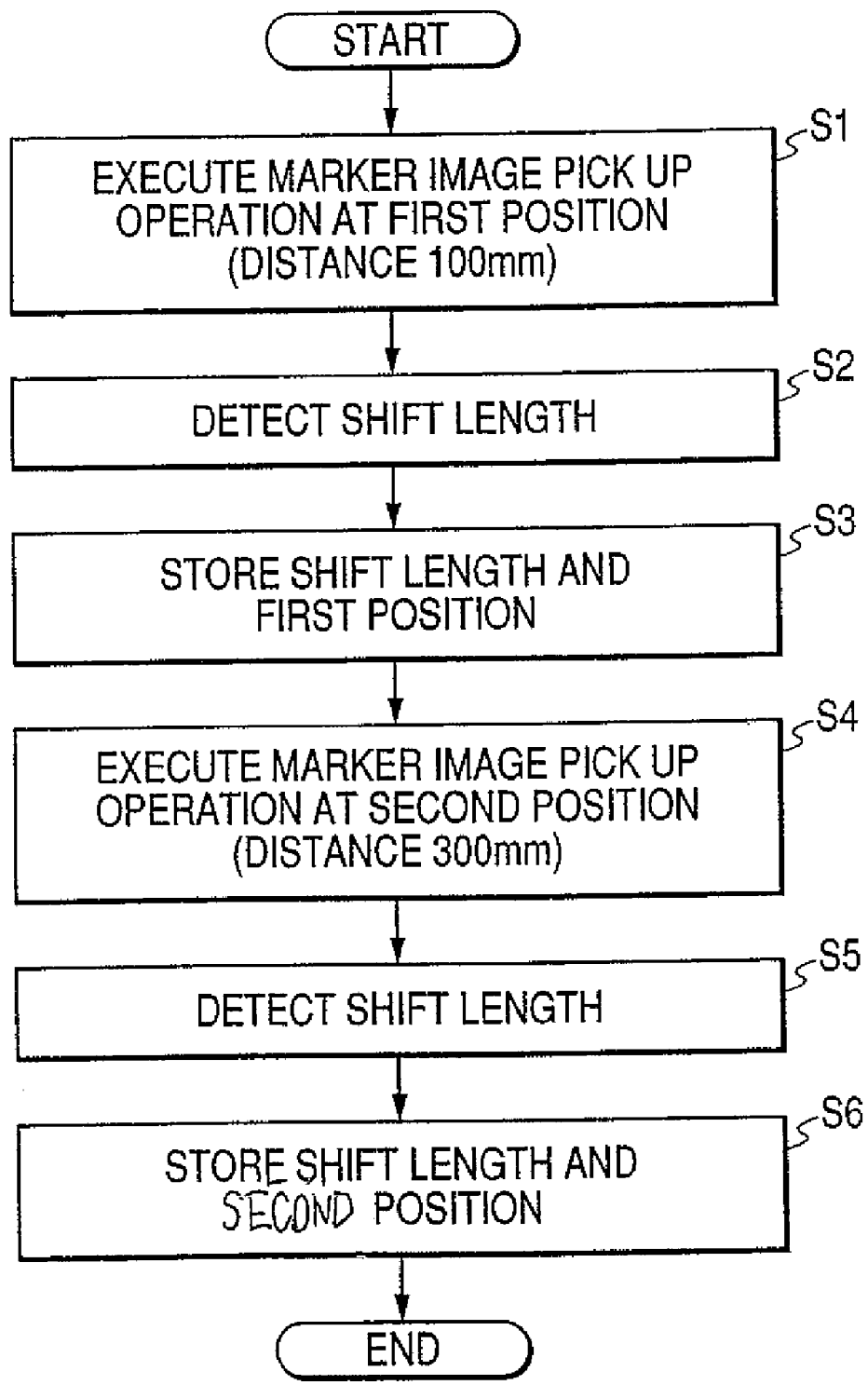
FIG. 4 is a flowchart indicative of operations executed by a control circuit shown in FIG. 2 when measuring a relationship between a reading distance and shift length according to the first embodiment.

FIG. 4 is a flowchart indicative of the operations executed by the control circuit 16 in accordance with the loaded program when measuring the relationship. The relationship is one between the shift length x of the center position Mo of the marker beam M with respect to the center of the field of view F and the reading distance L between the reading window 1c and the target R with changes in the distance L two times at, for example, the setting of the factory.

As shown in FIG. 4, in step S1, the control circuit 16 makes operate the photodetector 3 while a dummy target R' is located at a first position whose distance from the reading window 1c is previously determined of, for example, L1(=100 mm) and the marker beam M is being irradiated on the dummy target R'. The marker beam M irradiated on the dummy target R' is imaged on the pixel area of the photodetector 3. The photodetector 3, therefore, picks up the imaged marker beam M of the dummy target R' as a marker beam image.

In step S2, the control circuit 16 subjects the picked-up marker beam image to image processing, such as binarizing processing, to obtain the marker beam irradiated area in the field of view F on the dummy target R'. In step S2, the control circuit 16 detects the center position Mo of the marker beam M based on the obtained marker beam irradiated area in the field of view F on the dummy target R', thereby detecting the value (x1) of the shift length x of the center position Mo with respect to the field of view F. In step 53, the control circuit 16 stores in the memory 19 the relationship between the value (L1=100 mm) of the reading distance L and the value (xl) of the shift length x as part of the relationship data RD.

In step S4, the control circuit 16 makes operate the photodetector 3 while the dummy target R' is located at a second position whose distance from the reading window 1c of the main body 1a is previously determined of, for example, L3(=300 mm) and the marker beam M is being irradiated on the dummy target R'. The marker beam M irradiated on the dummy target R' is imaged on the pixel area of the photodetector 3. The photodetector 3, therefore, picks up the imaged marker beam M of the dummy target R' as a marker beam image.

Subsequently, in step S5, the control circuit 16 subjects the picked-up marker beam image to image processing similar to the step S2 to obtain the marker beam irradiated area in the field of view F on the dummy target R'. Next, in step S5, the control circuit 16 detects the center position Mo of the marker beam M based on the obtained marker beam irradiated area in the field of view F on the dummy target R', thereby detecting the value (x3) of the shift length x of the center position Mo with respect to the field of view F. In step S6, the control circuit 16 stores in the memory 19 the relationship between the value (L3=300 mm) of the reading distance L and the value (x3) of the shift length x as part of the relationship data RD.

As clearly illustrated in FIG. 3A, assuming that the center portion Mo of the marker beam M is shifted with respect to the center of the field of view F toward the upper direction along the orientation direction D, the shift length x of the marker beam M in this upper shift is positive; conversely, the shift length x of the marker beam M in the lower shift is negative.

In this assumption, the relationship between the shift length x and the reading distance L between the reading window 1c and the target R is represented as a linear function. Assuming that when the value of the shift length x is zero, the value of the reading distance L becomes L0, the linear function is represented as an equation of "L0−L=ax", where "a" is constant.

Determining, therefore, the relationships between at least two values of the shift length x and corresponding those of the reading distance L allows the distance L0 and the constant "a" to be easily calculated by means of simultaneous equations. This permits, even if the center position Mo of the marker beam M is shifted with respect to the center of the field of view F due to a positional and/or angular gap between the marker beam irradiating device 6 and the imaging lens 4 in assembling, such gaps in assembling to be appropriately responded.

After the two-dimensional code reader CR according to the first embodiment is made shipment, when a user wants to read the two-dimensional code Q written on the target R, the user makes locate the power-on state code reader CR so that the reading window 1c is opposite to the target R and away therefrom at an arbitrary distance.

While the code reader CR is arranged in such a state, because the marker beam M is continuously irradiated from the marker beam irradiating device 6, the user moves the code reader CR to a position where the irradiated marker beam M is applied on the target R. While the marker beam M is being irradiated on the target R, the user aligns the housing 1 (the reading window 1c) with the target R so that the two-dimensional code Q is located as much as possible to the center portion Mo of the marker beam M. After the alignment, the user operates the trigger switch 2 to turn it on.

Figure 5:
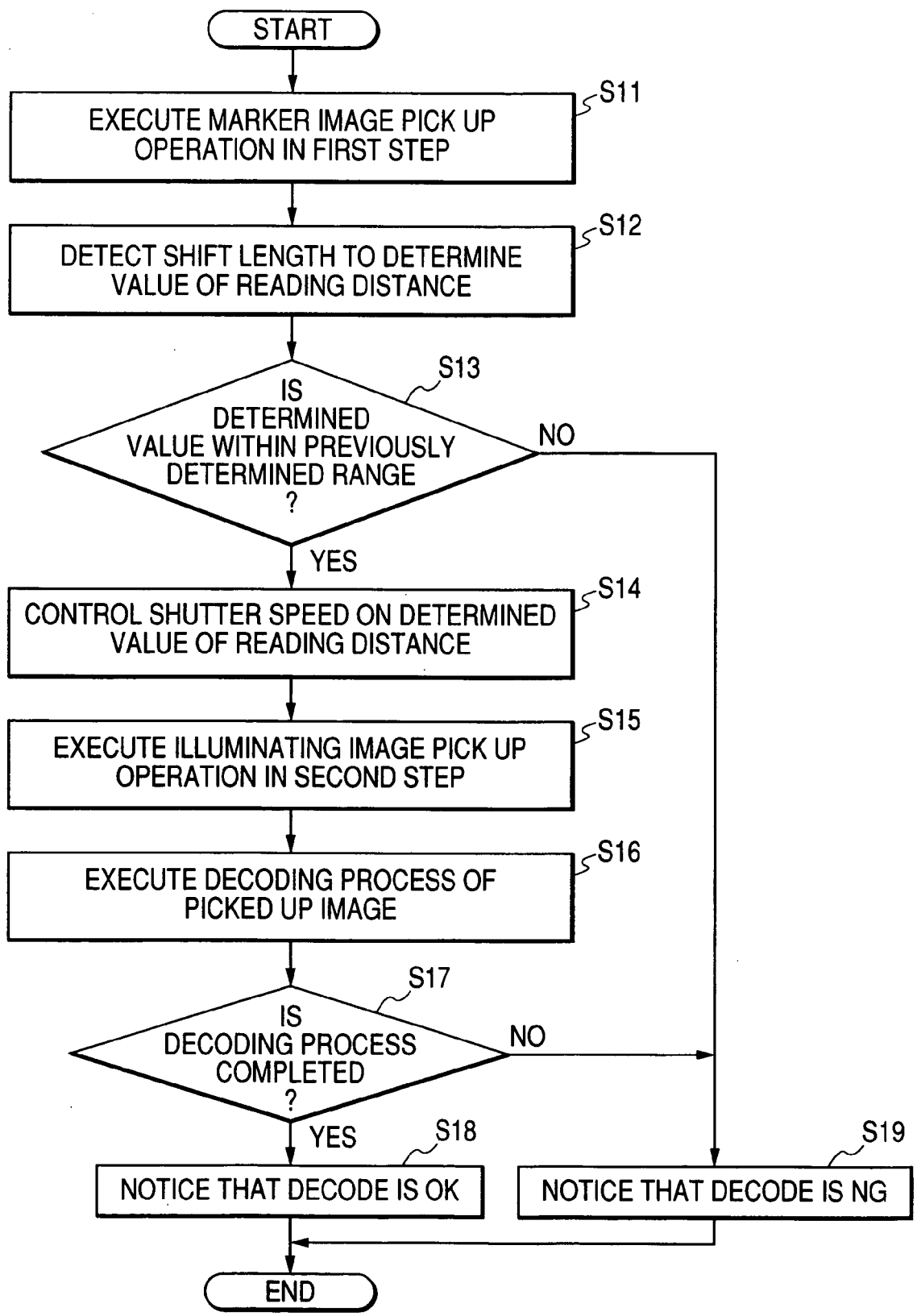
FIG. 5 is a flowchart indicative of operations for reading out a two-dimensional code executed by the control circuit in response to a turn-on operation of a trigger switch according to the first embodiment.

FIG. 5 is a flowchart indicative of the operations for reading out the two-dimensional code Q executed by the control circuit 16 in response to the turn-on operation of the trigger switch 2. FIG. 6A is a time chart illustrating on and off timings of the marker beam M (marker beam irradiating device 6) and the illuminating light (light illuminating devices 5). FIG. 6B is a time chart illustrating on and off timings of a marker beam and illuminating light of a conventional two-dimensional code reader for comparison.

As shown in FIG. 5, when the trigger switch 2 is turned on by the user, in step S11, the control circuit 16 exposes the photodetector 3 to pick up the marker image in the first image pickup step. That is, as shown in FIG. 6A, while the marker light irradiating device 6 is turned on so that the marker beam M is being irradiated on the target R; the illuminating light is kept off, the marker beam M irradiated on the target R is imaged on the pixel area of the photodetector 3, The marker beam image, therefore, is picked up by the photodetector 3.

In step S12, the control circuit 16 subjects the picked-up marker beam image to image processing, such as binarizing processing, to obtain the marker beam irradiated area in the field of view F on the target R. In step S12, the control circuit 16 detects the center position Mo of the marker beam M based on the obtained marker beam irradiated area in the field of view F on the target R, thereby detecting the value of the shift length x of the center position Mo with respect to the center of the field of view F.

In step S12, the control circuit 16 refers to the relationship information RD to determine the value of the reading distance L based on the value of the shift length x and the relationship information RD.

In step S13, the control circuit 16 determines whether the detected value of the reading distance L is within the previously determined range. When the determined value of the reading distance L is too short to be out of the previously determined range, the determination in step S13 is NO, the control circuit 16 shifts to step S19. When the determined value of the reading distance L is too long to be out of the previously determined range, the determination in step S13 is also NO, the control circuit 16 shifts to step S19.

In step S19, the control circuit controls at least one of the beeper 13 and the crystal liquid display 12 to provide notice indicative of the current value of the reading distance L being outside of the previously determined range, that is, a notice indicative that the current value of the reading distance is NG (not good), terminating the operations.

On the other hand, when the determined value of the reading distance L is within the previously determined range, the determination in step S13 is YES, the control circuit 16 shifts to step S14.

In step S14, the control circuit 16 controls the exposure time (shutter speed) of the photodetector 3 based on the determined value of the reading distance L in the second image pickup step.

Subsequently, in step S15, the control circuit 16 turns each of the light illuminating devices 5 on with the marker light irradiating device 6 turned off (see FIG. 6A). The control circuit 16 exposes the photodetector 3 based on the determined shutter speed (exposure time) to pick up the image of the two-dimensional code Q of the target R on which the illuminating light is irradiated.

This results in that illuminating light irradiated on the two-dimensional code Q of the target R is imaged on the pixel area of the photodetector 3. The illuminating image, therefore, is picked up by the photodetector 3.

In addition, because the shutter speed of the photodetector 3 is suitably determined depending on the current value of the reading distance L, the image of the two-dimensional code Q based on the illuminating light is completely accurately picked up in the pixel area of the photodetector 3. The picked up image is converted into image data based on the picked-up image by the amplifier 17 and the A/D converter 18.

In step S16, the control circuit 16 controls the specified ratio detection circuit 20, the synchronous signal generator 21, and the address generator 22 to decode the two-dimensional code Q based on the converted image data corresponding to the two-dimensional code Q.

In step S17, the control circuit 16 determines whether the decoding is successfully completed.

When determining that the decoding is successfully completed (the determination in step S17 is YES), the control circuit 16 controls, for example, the LED 11 to turn it on, thereby providing notice indicative of the decoding of the two-dimensional code Q is OK (the determination in step S17 is YES). On the other hand, when determining that the decoding is not successfully completed (the determination in step S17 is NO), the control circuit 16 controls at least one of the beeper 13 and the crystal liquid display 12 to provide notice indicative of the decoding of the two-dimensional code Q is NG (not good), terminating the operations.

As described above, in the first embodiment, the optical axis P of the marker beam M irradiated from the marker beam irradiating device 6 is designed to cross with the optical axis O of the imaging lens 4 at the minute angle θ. This allows the irradiation position, that is, the shift length x of the center portion Mo of the marker beam M on the target R to vary with respect to the center portion of the field of view F depending on the change of the reading distance L between the target R and the reading window 1c of the housing 1.

In the first embodiment, therefore, it is possible to determine the reading distance L using the marker light irradiating device 6 originally provided for marking the field of view F to align the two-dimensional code Q and the reading window 1c (the field of view F) during the read out operation without newly providing a range sensor with a high cost. This allows the cost of the two-dimensional code reader CR according to the first embodiment to decrease.

In addition, in the first embodiment, it is possible to eliminate the use of a space that allows a new range sensor to be disposed, thereby making the structure of the code reader CR simple and compact.

Moreover, in the first embodiment, it is possible to sufficiently accurately determine the reading distance L with decreasing error of measurement, as compared with a conventional code reader having means for measuring a period between the irradiation timing of a laser beam and the receiving timing of a reflected beam based on the irradiated laser beam.

Furthermore, in the first embodiment, appropriately determining the shutter speed (exposure time) of the photodetector 3 in the second image pickup step depending on the reading distance R between the target R and the reading window 1c permits the image to be well picked up by the photodetector 3, When the determined reading distance L is out of the predetermined range, it is possible to send a notice indicative the current reading distance L is NG to the user. This prompts the user to change the current location of the code reader CR, thereby changing the reading distance L between the target R and the reading window 1c of the code reader CR to more appropriate one.

Specifically, in the first embodiment, in the two-step image pickup operation, the marker beam image of the target R is firstly picked up by the photodetector 3; secondly the image of the two-dimensional code Q based on the illuminating light with the marker beam being off is picked up thereby. This allows both the position of the marker beam M and the two-dimensional code Q to be accurately detected. Moreover, the relationships between at least two values of the shift length x and corresponding those of the reading distance L are determined. This allows, even if the center position Mo of the marker beam M is shifted with respect to the center of the field of view F due to a positional and/or angular gap between the marker bema irradiating device 6 and the imaging lens 4 in assembling, such gaps in assembling to be appropriately responded. This makes it possible to accurately determine the reading distance L.

Second Embodiment

Figure 7:
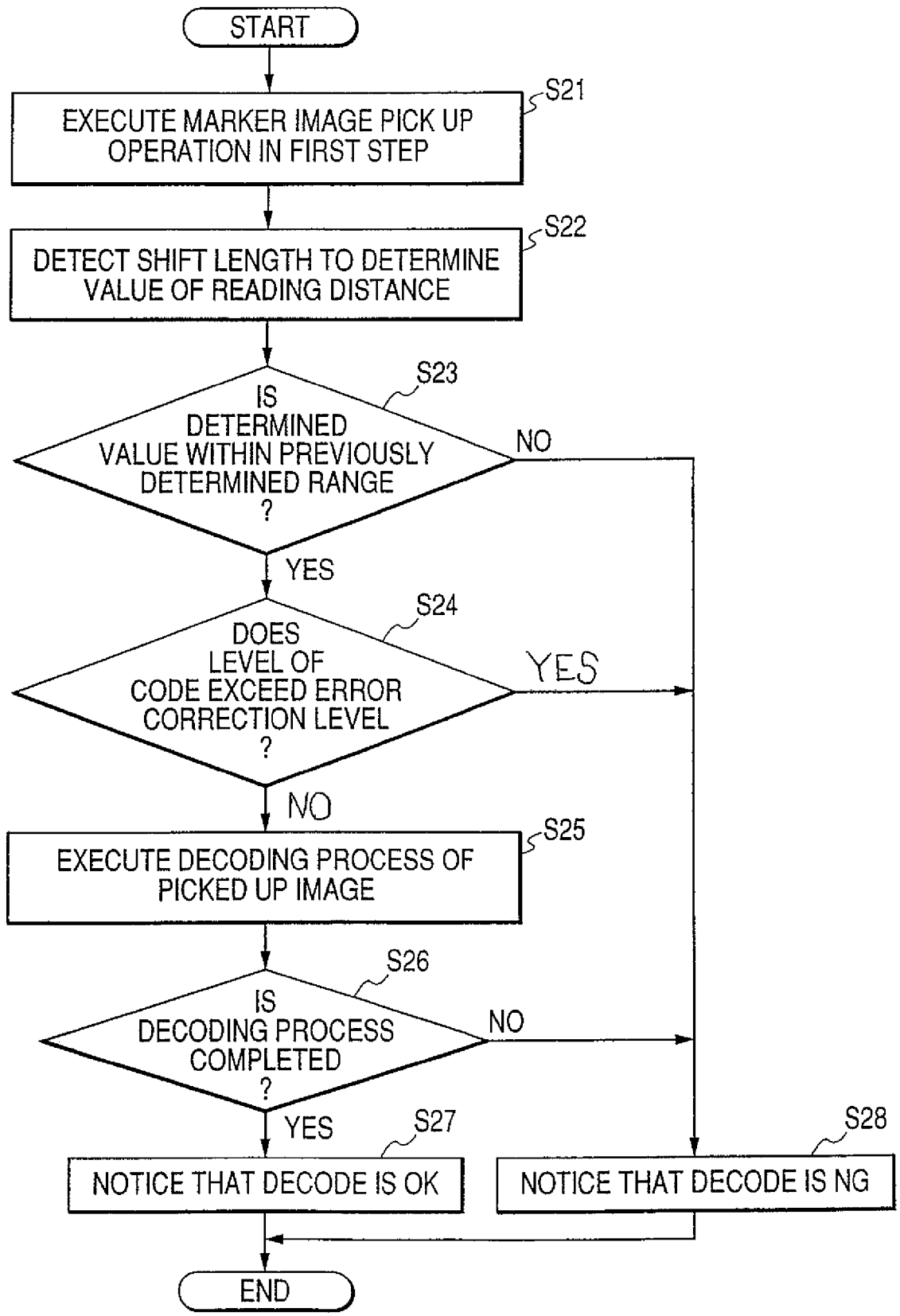
FIG. 7 is a flowchart indicative of operations for reading out the two-dimensional code executed by the control circuit in response to the turn-on operation of the trigger switch according to a second embodiment of the present invention.
Figure 8:
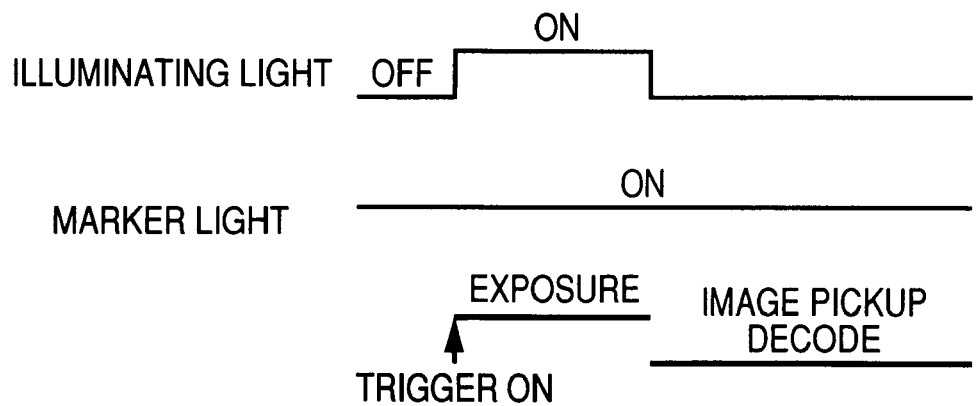
FIG. 8 is a time chart illustrating on and off timings of the marker beam and the illuminating light according to the second embodiment.

FIGS. 7 and 8 illustrate a second embodiment of the present invention. In the second embodiment, the invention is applied to a gun-shaped two-dimensional code reader, which is substantially identical with that of the first embodiment. Explanations of the elements of the two-dimensional code reader according to the second embodiment, which are substantially identical with those of the code reader CR according to the first embodiment, are omitted or simplified. That is, explanations are focused on points of the code reader according to the second embodiment, which are different from that according to the first embodiment.

In the second embodiment, in place of performing the two image pickup steps, after the marker beam image is firstly picked up, the irradiated position of the marker beam M, that is, the shift length x of the marker beam M is detected based on the picked-up image, and the two-dimensional code Q is decoded based on the picked-up image.

In addition, the two-dimensional code Q, such as QR code, has a Reed Solomon code that allows correcting errors included in the two-dimensional code based on the Reed Solomon code, even if the code area thereof is dirty or damaged up to 30% that represents the error correction level (capability) of a two-dimensional code. The error correction level is previously determined depending on the size of the two-dimensional code. The second embodiment uses such an error correcting function based on the Reed Solomon code, which is well known so that detailed descriptions of the error coding functions are omitted FIG. 7 is a flowchart indicative of the operations for reading out the two-dimensional code Q, such as QR code, executed by the control circuit 16 in response to the turn-on operation of the trigger switch 2. FIG. 8 is a time chart illustrating on and off timings of the marker beam M (marker beam irradiating device 6) and the illuminating light (light illuminating devices 5).

As shown in FIG. 7, when the trigger switch 2 is turned on by a user, in step S21, the control circuit 16 exposes the photodetector 3 to pick up the marker image in the first image pickup step. That is, as shown in FIG. 8, while the marker light irradiating device 6 is kept on so that the marker beam M is being irradiated on the target R, the illuminating light is also being irradiated on the two-dimensional code Q of the target R. The marker beam M irradiated on the target R is imaged to be superimposed on the image of the two-dimensional code Q based on the illuminating light on the pixel area of the photodetector 3 (see FIG. 3). The superimposed image of the marker beam image and the image of the two-dimensional code Q is, therefore, picked up by the photodetector 3.

In step S22, the control circuit 16 subjects the picked-up superimposed image to image processing, such as binarizing processing, to obtain the marker beam irradiated area in the field of view F on the target R. In step S22, the control circuit 16 detects the center position Mo of the marker beam M based on the obtained marker beam irradiated area in the field of view F on the target R, thereby detecting the value of the shift length x of the center position Mo with respect to the center of the field of view F.

In step S22, the control circuit 16 refers to the relationship information RD to determine the value of the reading distance L based on the value of the shift length x and the relationship information RD.

Incidentally, though the third marker beam component M3 is superimposed on the image of the two-dimensional code Q, it is possible to detect the center position Mo of the marker beam M based on the first marker beam component M1.

In step S23, the control circuit 16 determines whether the detected value of the reading distance L is within the previously determined range. When the determined value of the reading distance L is too short to be out of the previously determined range, the determination in step S23 is NO, the control circuit 16 shifts to step S28. When the determined value of the reading distance L is too long to be out of the previously determined range, the determination in step S23 is also NO, the control circuit 16 shifts to step S28.

In step S28, the control circuit 16 controls at least one of the beeper 13 and the crystal liquid display 12 to provide notice indicative of the current value of the reading distance L being outside of the previously determined range, that is, notice indicative that the current value of the reading distance is NG (not good), terminating the operations.

On the other hand, when the determined value of the reading distance L is within the previously determined range, the determination in step S23 is YES, the control circuit 16 shifts to step S24.

As set forth above, because the third marker beam component M3 is superimposed on part of the image of the two-dimensional code Q, the superimposed part of the two-dimensional code image may not accurately read out, similar to the dirty or damaged portion.

In step S24, therefore, the control circuit 16 determines whether a level determined by the total area of the superimposed portion and the dirty and the damaged portions with respect to the whole area of the two-dimensional code Q exceeds the predetermined error correction level of the two-dimensional code.

When determining that the determined level of the total area exceeds the predetermined error correction level of the two-dimensional code, the determination in step S24 is YES, the control circuit 16 shifts to step S28 to execute the notice (alarm) generating operation.

When determining that the determined level of the total area does not exceed the predetermined error correction level of the two-dimensional code, the determination in step S24 is NO, the control circuit 16 shifts to step S25.

Subsequently, in step S25, the control circuit 16 controls the specified ratio detection circuit 20, the synchronous signal generator 21, and the address generator 22 to decode the two-dimensional code Q based on the converted image data corresponding to the two-dimensional code Q by means of the error correcting function using the Reed Solomon code.

In step S26, the control circuit 16 determines whether the decoding is successfully completed.

When determining that the decoding is successfully completed (the determination in step S26 is YES), the control circuit 16 controls, for example, the LED 11 to turn it on, thereby providing notice indicative of the decoding of the two-dimensional code Q is OK (the determination in step S26 is YES). On the other hand, when determining that the decoding is not successfully completed (the determination in step S26 is NO), the control circuit 16 controls at least one of the beeper 13 and the crystal liquid display 12 to provide notice indicative of the decoding of the two-dimensional code Q is NG (not good), terminating the operations.

As described above, in the second embodiment, it is possible to determine the reading distance L using the marker light irradiating device 6 originally provided for aligning the two-dimensional code Q and the reading window 1c during the readout operation without newly providing a range sensor with a high cost, which is similar to the first embodiment. This allows the cost of the two-dimensional code reader CR according to the first embodiment to decrease.

In addition, in the second embodiment, one image picking up operation allows both the detection of the irradiated position of the marker beam M on the target R (shift length x) and the readout of the two-dimensional code Q to be executed. This makes it possible to improve the efficiency of detecting the shift length x and reading out the two-dimensional code Q.

Third Embodiment

Figure 9A:
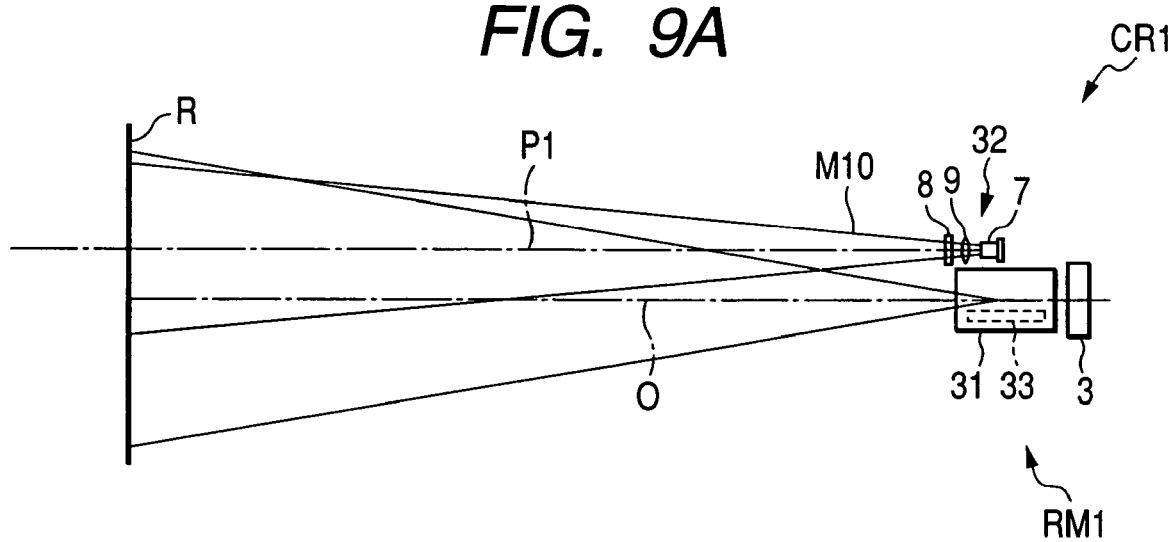
FIG. 9A is a view schematically illustrating a reading mechanism according to a third embodiment of the present invention.
Figure 9B:
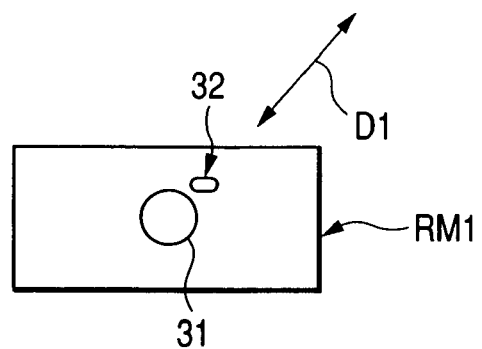
FIG. 9B is a view schematically illustrating the reading mechanism as it is viewed from the reading window side according to the third embodiment.

A third embodiment of the present invention will be described hereinafter with reference to FIGS. 9A to 13. FIG. 9A is a view schematically illustrating a reading mechanism RM1 of a two-dimensional code reader CM1 according to the third embodiment of the present invention. FIG. 9B is a view schematically illustrating the reading mechanism RM1 from the reading window side according to the third embodiment. Explanations of the elements of the two-dimensional code reader according to the third embodiment, which are substantially identical with those of the code reader CR according to the first embodiment, are omitted or simplified.

As shown in FIGS. 9A and 9B, the two-dimensional code reader CR1 is provided with a reading mechanism RM1 disposed in the head portion of the housing 1 (main body 1a).

The reading mechanism RM1, similar to the structure of the reading mechanism RM according to the first embodiment, has the photodetector 3 and the pair of light illuminating devices 5.

The reading mechanism RM1 is also provided with an imaging lens 31 and a marker beam irradiating device 32.

The imaging lens 31 has a body tube and a plurality of lens elements that are disposed coaxially therein. The imaging lens 31 has a total predetermined optical axis. The imaging lens 31 is arranged so that its total optical axis O (see FIG. 9A) extends orthogonally with the head end surface, which is formed with the reading window 1c, of the main body 1a.

The imaging lens 31 further has a focal point variable mechanism 33. The focal point variable mechanism 33 has a drive unit, such as a motor, a solenoid, or the like, that is mechanically linked to at least one of the lens elements so that the focal point variable mechanism 33 drives to move the at least one of the lens elements along the optical axis O to change the focal point.

The marker beam irradiating device 32, similar to the first embodiment, has the laser diode 7, the hologram 8, and the condenser lens 9. In the third embodiment, the laser diode 7 is operative to irradiate a laser beam so that the irradiated laser beam is focused on the hologram 8 by the condenser lens 9. The laser beam is split by the hologram 8 so that a marker beam M10 consisting of split beam components is irradiated on the target R.

Figure 10A:
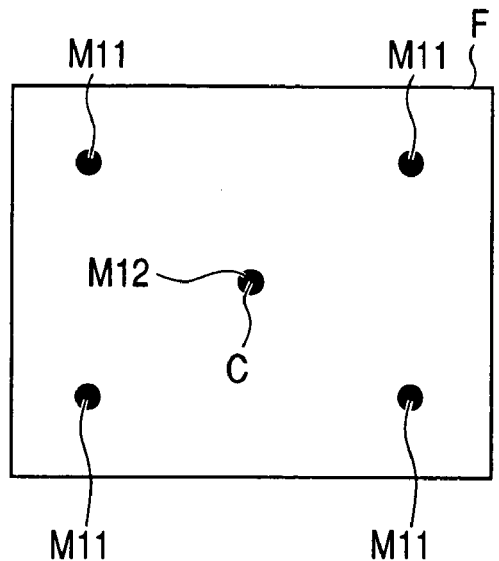
FIG. 10A is a view schematically illustrating marker beam components of a marker beam shown in FIG. 9A according to the third embodiment.
Figure 10B:
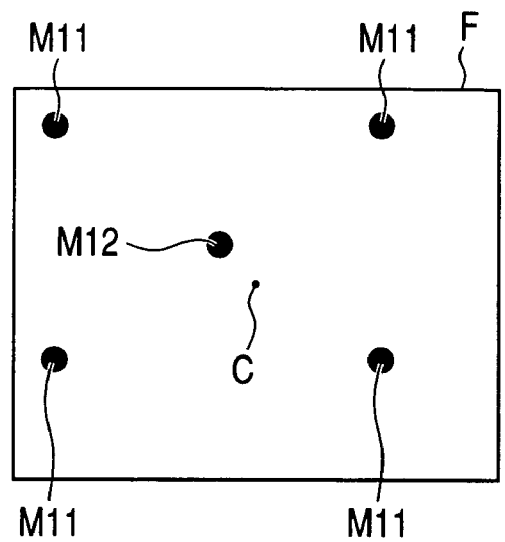
FIG. 10B is a view schematically illustrating the marker beam components of the marker beam shown in FIG. 10A when the marker beam is shifted along an obliquely (radially) left-upward direction inclined with respect to an optical axis at an angle of 45.0 degrees according to the third embodiment.

Specifically, in the third embodiment, as shown in FIGS. 10A and 10B, the marker beam M10 consists of four dot-shaped beam components M11 constituting four corner portions of a rectangular marker beam field, and one dot-shaped beam component M12 arranged at the center portion of the rectangular marker beam field.

In the third embodiment, each of the light illuminating devices 5 (see FIGS. 1 and 2) is disposed around the imaging lens 31 except for one radial side, specifically obliquely right-upward side, thereof.

The marker beam irradiating device 32, as shown in FIG. 9A, is disposed around the imaging lens 31. For example, the marker beam irradiating device 32 is disposed to the one radial side (obliquely right-upward side) of the imaging lens 31 so that each of the light illuminating device 5 and the marker beam irradiating device 6 are positionally free from each other.

As shown in FIG. 9B, the orientation direction D1 between the imaging lens 31 and the marker beam irradiating device 32 is inclined with respect to the optical axis O at an angle of approximately 45.0 degrees.

In addition, as shown in FIG. 9A, the optical axis P1 of the marker beam irradiating device 6, that is, the optical axis P1 of the marker beam M10, is designed to be parallel to the optical axis O of the imaging lens 4 (the photodetector 3).

When the code reader CR1 is arranged so that the reading distance L between the reading window 1c and the target R is comparatively longer, the beam component M12, referred to "center portion" in the third embodiment, of the marker beam M10 irradiated on the target R substantially coincides with the center C of the field of view F of the photodetector 3 (see FIG. 10A).

Figure 11:
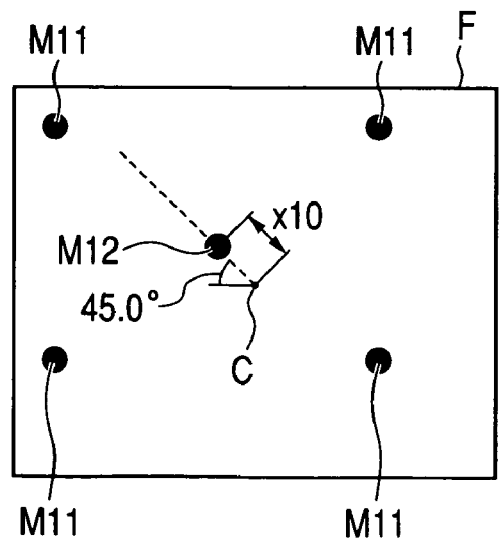
FIG. 11 is a view schematically illustrating a scan direction along the left-upside direction with respect to a center of a field of view according to the third embodiment.

When the code reader CR1 is arranged so that the reading distance L between the reading window 1c and the target R is comparatively shorter, the center portion M12 of the marker beam M10 irradiated on the target R is shifted along a direction, specifically, an obliquely left-upward direction inclined with respect to the optical axis O at the angle of 45.0 degrees (see FIGS. 10B and 11).

That is, in the third embodiment, the distance x10 between the center portion M12 of the marker beam M10 and the center C of the field of view F is designed to vary depending on the change of the reading distance L between the target R and the reading window 1c of the housing 1. This feature is explainable of the similar relationship between the marker beam M10, the imaging lens 31, and the field of view F.

In the third embodiment, the control circuit 16 operates to cause the marker beam irradiating device 6, the photodetector 3, and the like to pick up an image (marker beam image) of the target R on which the marker beam M10 is being irradiated. In addition, the control circuit 16 operates to detect the irradiated position of the marker beam M10 from the picked-up image, thereby determining the reading distance L between the target R and the reading window 1c.

For detecting the irradiated position of the marker beam M10 from the picked-up image, the control circuit 16 scans each pixel data in a predetermined area in the image data to detect the irradiated position of the marker beam M10, in other words, the shift length x10 of the marker beam M10. In the third embodiment, the control circuit 16, as shown in FIG. 11, scans each pixel along the left-upside direction with respect to the center C of the field of view F inclined to the optical axis O at the angle of 45 degrees, thereby detecting the shift length x10 of the marker beam M10.

Moreover, the control circuit 16 operates to determine the distance L between the reading window 1c and the target R based on the detected shift length x10, thereby determining a suitable focal point matched with the reading distance L. Furthermore, the control circuit 16 operates to cause the focal point variable mechanism 33 to shift at least one of the lens elements along the optical axis O at a position matched with the determined focal point. After adjusting the focal point, the control circuit 16 operates to cause the light illuminating devices 5, the photodetector 3, and the like to pick up an image of the two-dimensional code of the target R on which the illuminating light is being irradiated.

Figure 12:
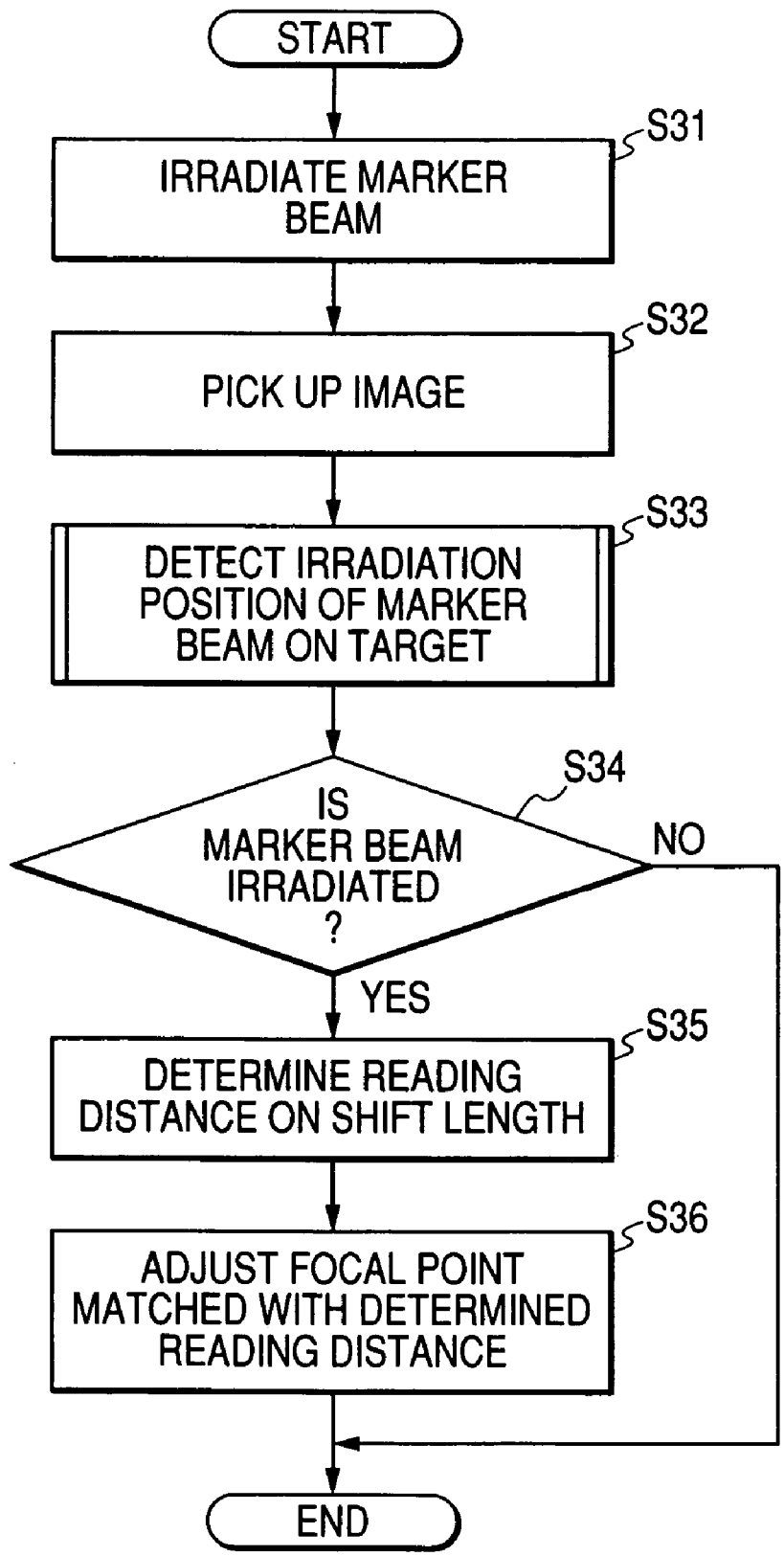
FIG. 12 is a flowchart indicative of picking up operations of a marker beam image and focal point adjusting operations executed by the control circuit according to the third embodiment.

FIG. 12 is a flowchart indicative of the picking up operations of the marker beam image and the focal point adjusting operations executed by the control circuit 16 and the like in accordance with the loaded program.

As shown in FIG. 12, when the trigger switch 2 is turned on by the user, in step S31, the control circuit 16 controls the marker beam irradiating device 32 to irradiate the marker beam M10 to the target R. In step S32, the control circuit 16 exposes the photodetector 3 to pick up the marker image. That is, while the marker beam M is being irradiated on the target R, the marker beam M irradiated on the target R is imaged on the pixel area of the photodetector 3. The marker beam image, therefore, is picked up by the photodetector 3. The marker beam image is amplified by the amplifier 17 to be converted into digital image data (pixel data) by the A/D converter 18.

In step S33, the control circuit 16 detects subjects the image data (pixel data of each pixel) to image processing, such as binarizing processing, to detect the shift length x1 of the marker beam M10.

Figure 13:
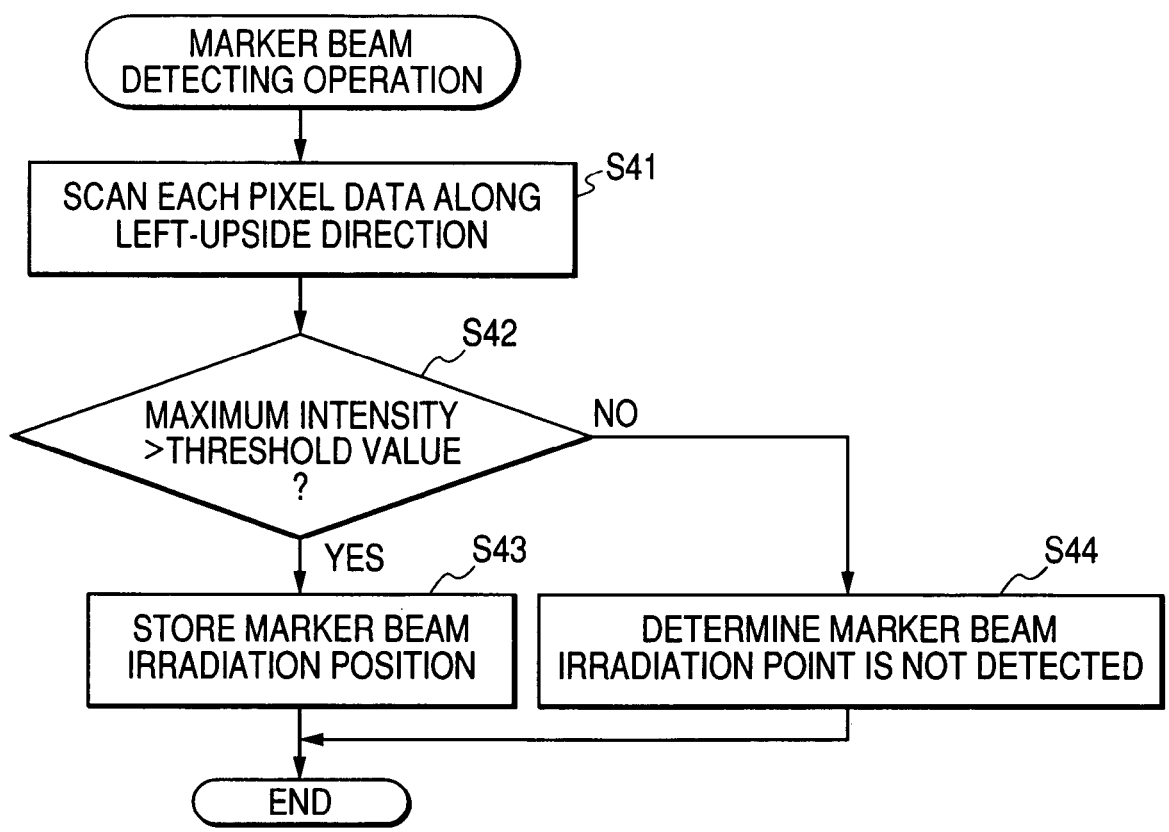
FIG. 13 is a flowchart illustrating marker beam detecting operations of the control circuit in step S33 shown in FIG. 12.

FIG. 13 is a flowchart illustrating the marker beam detecting operations of the control circuit 16 in step S33.

That is, in step S41, the control circuit 16 scans each pixel data (pixel line) of the image data along the left-upside direction with respect to the center C of the field of view F inclined to the optical axis O at the angle of 45 degrees (see FIG. 11). Specifically, in step S41, the control circuit 16 scans several pixel lines of the image data around the left-upside direction in consideration of errors in assembling and the size of each beam component of the marker beam M10 to detect the maximum pixel value in the scanned region.

Subsequently, in step S42, the control circuit 16 determines whether the detected maximum pixel value exceeds a predetermined value. When determining that the detected maximum pixel value exceeds the predetermined value (the determination in step S42 is YES), the control circuit 16 regards the position (at least one pixel) of the maximum pixel value as the center portion M12 of the marker beam M10 to store the position (pixel) of the center portion M12 of the marker bean M10 in the RAM (step S43).

When it is determined that the detected maximum pixel value does not exceed the predetermined value (the determination in step S42 is NO), the control circuit 16 determines that the center position M12 of the marker beam M10 is not detected (step S44).

Subsequently, in step S34 the control circuit 16 determines whether the center portion M12 of the marker beam M10 is detected. When determining that the center portion M12 of the marker beam M10 is detected (the determination in step S34 is YES), the control circuit 16 determines the reading distance L between the reading window 1$c$ and the target R based on the determined center portion M12 of the marker beam M10, that is, the shifted length x10 in step S35. In step S36, the control circuit 16 determines a suitable focal point matched with the determined reading distance L. Furthermore, the control circuit 16 causes the focal point variable mechanism 33 to shift at least one of the lens elements along the optical axis O at a position matched with the determined focal point. After adjusting the focal point, the control circuit 16 controls the light illuminating devices 5, the photodetector 3, and the like to pick up an image of the two-dimensional code Q of the target R on which the illuminating light is being irradiated. As a result, the image of the two-dimensional code Q is picked up by the photodetector 3.

When determining that the center portion M 12 of the marker beam M10 is not detected (the determination in step S34 is NO), the control circuit 16 terminates the operations.

As described above, in the third embodiment, in addition to the effects of the first embodiment, the following effects can be obtained. That is, when detecting the center position of the marker beam M10, it is possible to limit the scan region of detecting the center position of the marker beam M10 based on the shape of the marker beam M and the orientation of the marker irradiating device 32 with respect to the imaging lens 31, This makes it possible to reduce the time required to detect the position of the marker beam M10 on the target R. Especially, in the third embodiment, it is possible to adjust the focal point of the imaging lens 31 depending on the determined reading distance L. This allows the two-dimensional code Q to be well read out.

Fourth Embodiment

Figure 14:
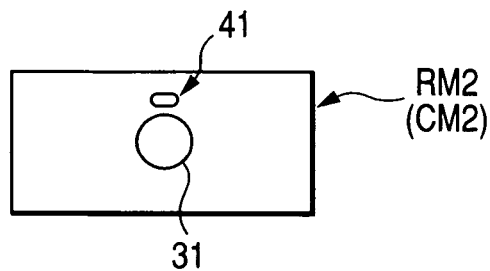
FIG. 14 is a view schematically illustrating a reading mechanism as it is viewed from the reading window side according to a fourth embodiment.

A fourth embodiment of the present invention will be described hereinafter with reference to FIGS. 14 to 17. FIG. 14 is a view schematically illustrating a reading mechanism RM2 from the reading window side according to the fourth embodiment. Explanations of the elements of a two-dimensional code reader CR2 according to the fourth embodiment, which are substantially identical with those of the code reader CR1 according to the third embodiment, are omitted or simplified.

In the fourth embodiment, each of the light illuminating devices 5 (see FIGS. 1 and 2) is disposed around the imaging lens 31 except for one radial side, specifically top side, thereof.

The marker beam irradiating device 41, as shown in FIGS. 9A and 14, is disposed around the imaging lens 31 having the focal point variable mechanism 33. For example, the marker beam irradiating device 41 is disposed to the one radial side (top side) of the imaging lens 31 so that each of the light illuminating device 5 and the marker beam irradiating device 41 are positionally free from each other.

The marker beam irradiating device 41, similar to the third embodiment, has the laser diode 7, the hologram 8, and the condenser lens 9. In the fourth embodiment, the laser diode 7 is operative to irradiate a laser beam so that the irradiated laser beam is focused on the hologram 8 by the condenser lens 9. The laser beam is split by the hologram 8 so that a marker beam M20 consisting of split beam components is irradiated on the target R.

Figure 15A:
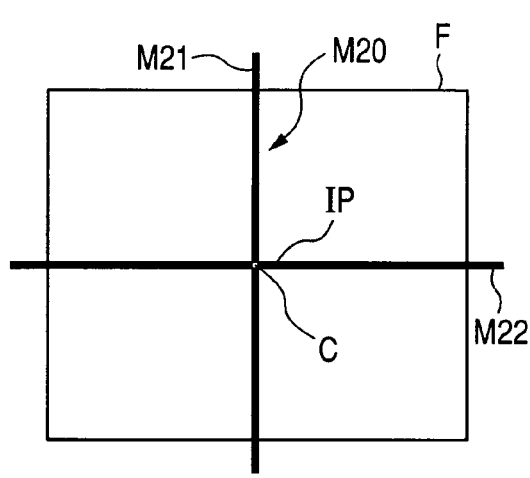
FIG. 15A is a view schematically illustrating vertical and horizontal line beam components of a marker beam according to the fourth embodiment.
Figure 15B:
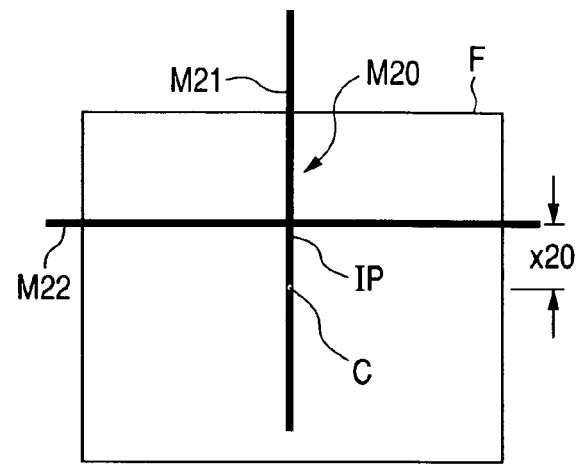
FIG. 15B is a view schematically illustrating the vertical and horizontal line beam components shown in FIG. 15A when an intersection point of them is shifted along a top side direction with respect to a center of a field of view according to the fourth embodiment.

Specifically, in the fourth embodiment, as shown in FIGS. 15A and 15B, the marker beam M20 consists of a vertical line beam component M21 and a horizontal line beam component M22. The vertical line beam component M21 extends along the top-to-bottom (vertical) direction corresponding to the vertical scan line of the pixel area of the photodetector 3, and the horizontal line beam component M22 extends along the horizontal direction corresponding to the horizontal scan line of the pixel area of the photodetector 3.

The optical axis of the marker beam M20 is parallel to the optical 6 axis O of the imaging lens 31 (photodetector 3).

When the code reader CR2 is arranged so that the reading distance L between the reading window 1$c$ and the target R is comparatively longer, the intersection point IP between the vertical and horizontal line beam components M21 and M22 of the marker beam M20 irradiated on the target R substantially coincides with the center C of the field of view F of the photodetector 3 (see FIG. 15A).

When the code reader CR2 is arranged so that the reading distance L between the reading window 1c and the target R is comparatively shorter, the intersection point (center point) IP between the vertical and horizontal line beam components M21 and M22 of the marker beam M20 irradiated on the target R is shifted along the one side (top side) direction with respect to the center C of the field of view F (see FIG. 115B).

That is, in the fourth embodiment, the shift length x20 between the intersection point IP of the marker beam M20 and the center C of the field of view F is designed to vary depending on the change of the reading distance L between the target R and the reading window 1c of the housing 1.

In the fourth embodiment, the control circuit 16 operates to cause the marker beam irradiating device 6, the photodetector 3, and the like to pick up an image (marker beam image) of the target R on which the marker beam M20 is being irradiated. In addition, the control circuit 16 operates to detect the irradiated position of the marker beam M20 from the picked-up image, thereby determining the reading distance L between the target R and the reading window 1c.

For detecting the irradiated position of the marker beam M20 from the picked-up image, which corresponds to step S33 shown in FIG. 12, the control circuit 16 performs the following operations.

Figure 16:
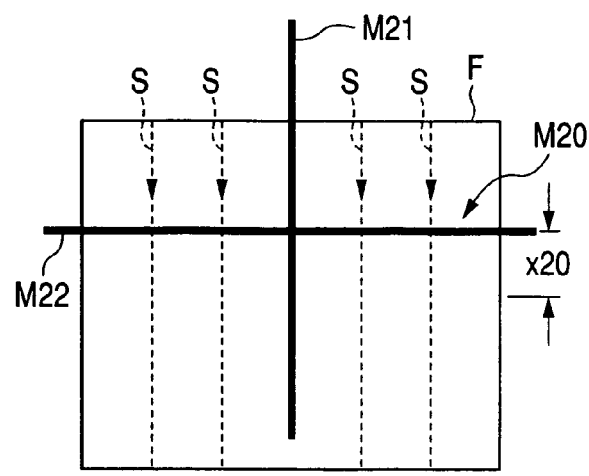
FIG. 16 is a view schematically illustrating a plurality of scan lines set on image data according to the fourth embodiment.
Figure 17:
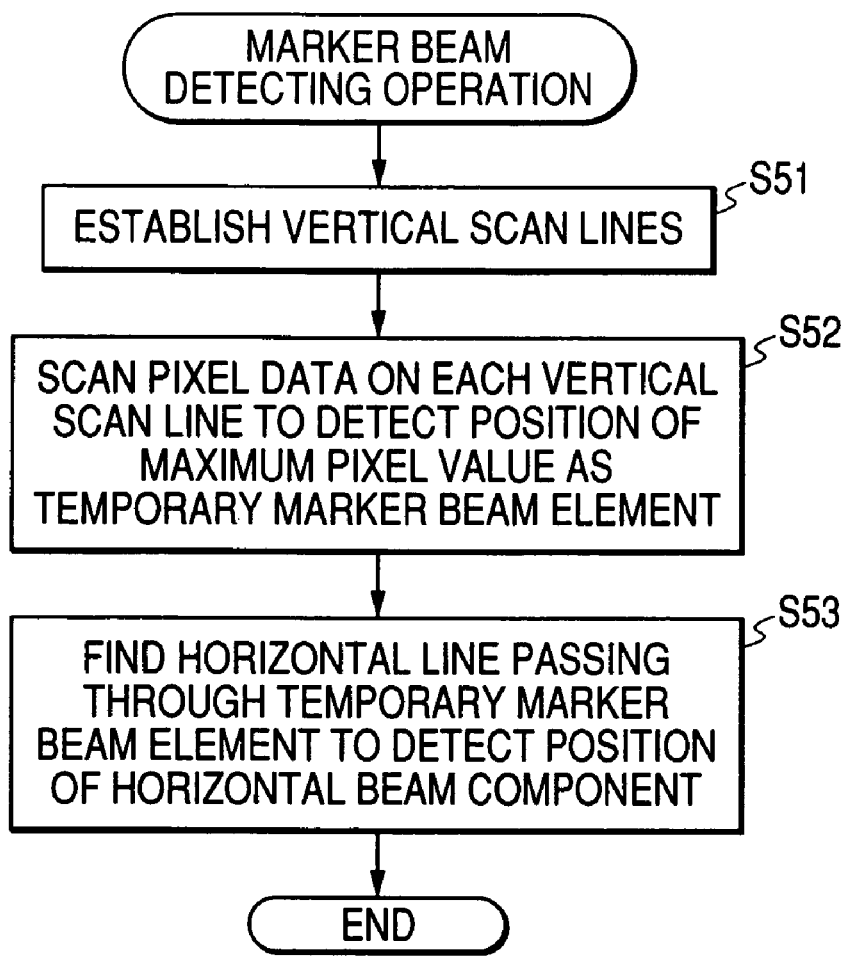
FIG. 17 is a flowchart illustrating marker beam detecting operations of the control circuit in step S33 shown in FIG. 12 according to the fourth embodiment.

That is, the control circuit 16 establishes, as a limited scan region, a plurality of vertical scan lines (vertical pixel lines) S each orthogonal to the horizontal beam component M22 on the image data and scans the vertical scan lines S, respectively. In the fourth embodiment, as shown in FIG. 16, four vertical scan lines S are established on the image data except for the center C of the field of view F. In the fourth embodiment, when scanning the pixel data of each of the vertical scan lines S, it is good enough to substantially scan the one radial side (top side) portion of each vertical scan line with respect to the center C of the field of view F. That is, the scan of the remaining bottom portion of each vertical scan line is unnecessary in step S51 of FIG. 17.

In addition, the control circuit 16 scans the pixel data on each of the vertical scan lines S to detect the maximum pixel value in each of the scan lines S so that the control circuit 16 temporarily sets each of the position (pixel) of the maximum pixel value of each of the scan lines S to a temporary marker beam element in step S52.

The control circuit 16 finds a horizontal line passing through each temporary marker beam element and orthogonal to each of the scan lines S, recognizing the horizontal line as the position of the horizontal beam component M22 in step S53.

After the recognition, the control circuit 16 determines the shift length x20 between the recognized position of the horizontal beam component M22 along the top-to-bottom (vertical) direction and the center C of the field of view F; determines the reading distance L between the reading window 1c and the target R based on the determined shift length x20 (see steps S34 and S35 of FIG. 12).

Subsequently, the control circuit 16 determines a suitable focal point matched with the determined reading distance L. Furthermore, the control circuit 16 causes the focal point variable mechanism 33 to shift at least one of the lens elements along the optical axis O at a position matched with the determined focal point in step S36. After adjusting the focal point, the control circuit 16 controls the light illuminating devices 5, the photodetector 3, and the like to pick up an image of the two-dimensional code of the target R on which the illuminating light is being irradiated. As a result, the image of the two-dimensional code Q is picked up by the photodetector 3.

As described above, in the fourth embodiment, similar to the third embodiment, scanning the vertical scan lines S allows the position of the horizontal beam component M22 to be detected. This makes it possible to reduce the time required to detect the marker beam M20. Especially, in the fourth embodiment, it is possible to adjust the focal point of the imaging lens 31 depending on the determined reading distance L. This allows the two-dimensional code Q to be well read out.

Incidentally, in the fourth embodiment, the position of the horizontal beam component M22 along the top-to-bottom (vertical) direction in the marker beam M20 is detected; the position of the vertical beam component M21 along the horizontal direction in the marker beam M20 may be detected. In addition, when detecting both the position of the horizontal beam component M22 along the vertical direction and that of the vertical beam component M21 along the horizontal direction, it may be possible to detect the intersect portion IP (barycentric position of them). This allows the position of the marker beam M20 to be further accurately detected.

Fifth Embodiment

Figure 18:
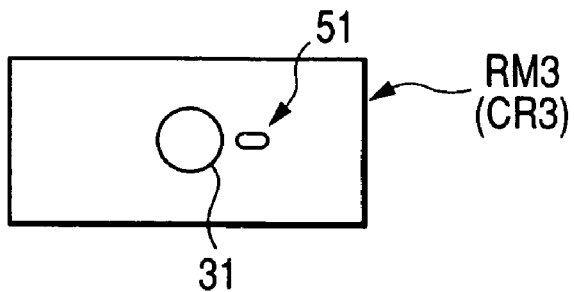
FIG. 18 is a view schematically illustrating a reading mechanism as it is viewed from the reading window side according to a fifth embodiment.

A fifth embodiment of the present invention will be described hereinafter with reference to FIGS. 18 to 21. FIG. 18 is a view schematically illustrating a reading mechanism RM3 from the reading window side according to the fifth embodiment. Explanations of the elements of a two-dimensional code reader CR3 according to the fifth embodiment, which are substantially identical with those of the code reader CR1 according to the third embodiment, are omitted or simplified.

In the fifth embodiment, each of the light illuminating devices 5 (see FIGS. 1 and 2) is disposed around the imaging lens 31 except for one radial side, specifically right side, thereof viewing from the reading window side.

The marker beam irradiating device 51, as shown in FIGS. 9A and 18, is disposed around the imaging lens 31 having the focal point variable mechanism 33. For example, the marker beam irradiating device 51 is disposed to the one radial side (right side) of the imaging lens 31 so that each of the light illuminating device 5 and the marker beam irradiating device 51 are positionally free from each other.

The marker beam irradiating device 51, similar to the third embodiment, has the laser diode 7, the hologram 8, and the condenser lens 9. In the fifth embodiment, the laser diode 7 is operative to irradiate a laser beam so that the irradiated laser beam is focused on the hologram 8 by the condenser lens 9. The laser beam is split by the hologram 8 so 6 that a marker beam M30 consisting of split beam components is irradiated on the target R.

Figure 19A:
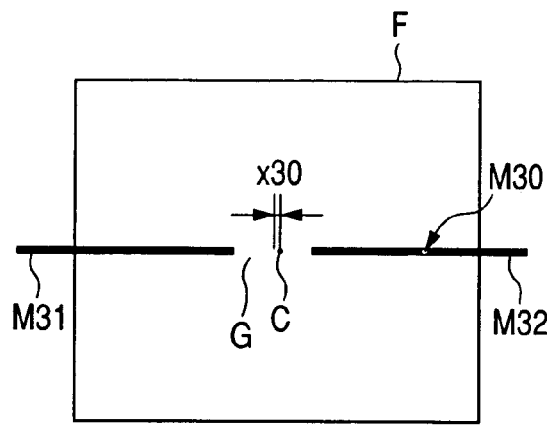
FIG. 19A is a view schematically illustrating line beam components of a marker beam according to the fifth embodiment.
Figure 19B:
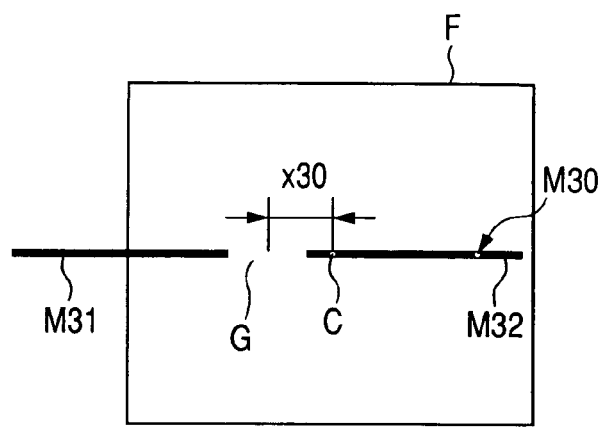
FIG. 19B is a view schematically illustrating the line beam components shown in FIG. 19A when an intermediate portion of them is shifted along a horizontal direction toward a left side with respect to top side direction with respect to a center of a field of view the center of the field of view according to the fifth embodiment.

Specifically, in the fifth embodiment, as shown in FIGS. 19A and 19B, the marker beam M30 consists of two line beam components M31 and M32. The line beam components M31 and M32 are disposed in alignment along the horizontal direction on the center C of the field of view F with an interval G therebetween. The optical axis of the marker beam M30 is parallel to the optical axis O of the imaging lens 31 (photodetector 3).

When the code reader CR3 is arranged so that the reading distance L between the reading window 1c and the target R is comparatively longer, the intermediate portion of the interval G between the beam components M31 and M32 of the marker beam M30 irradiated on the target R substantially coincides with the center C of the field of view F of the photodetector 3 (see FIG. 19A).

Figure 20A:
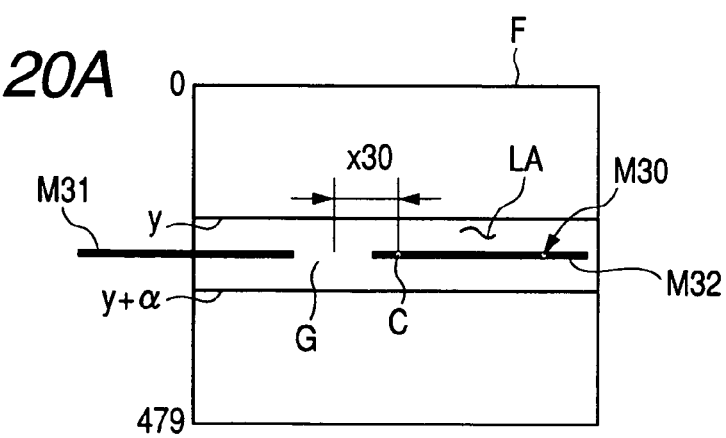
FIG. 20A is a view schematically illustrating a limited area determined on image data according to the fifth embodiment.

When the code reader CR3 is arranged so that the reading distance L between the reading window 1c and the target R is comparatively shorter, the intermediate portion of the interval G between the beam components M31 and M32 of the marker beam M30 irradiated on the target R is shifted along the horizontal direction toward the other radial side (left side) with respect to the center F of the field of view F (see FIGS. 19B and 20A).

That is, in the fifth embodiment, the shift length x30 between the intermediate portion of the interval G of the marker beam M30 and the center C of the field of view F is designed to vary depending on the change of the reading distance L between the target R and the reading window 1c of the housing 1.

In the fifth embodiment, the control circuit 16 operates to cause the marker beam irradiating device 6, the photodetector 3, and the like to pick up an image (marker beam image) of the target R on which the marker beam M30 is being irradiated. In addition, the control circuit 16 operates to detect the irradiated position of the marker beam M30 from the picked-up image, thereby determining the reading distance L between the target R and the reading window 1c.

For detecting the irradiated position of the marker beam M30 from the picked-up image, which corresponds to step S33 shown in FIG. 12, the control circuit 16 performs the following operations.

Namely, the control circuit 16 establishes, as a limited scan region, continuous horizontal pixel lines (horizontal scan lines) including the horizontal line on the center C of the field of view F. In the fifth embodiment, as shown in FIG. 20A, a limited area LA from the y-th horizontal scan line to the "y+α-th" horizontal scan line of the image data, in which the center C of the field of view F is included, is established on the image data. Incidentally, in FIG. 20A, for example, the number of horizontal scan lines of the image data is set to 479.

In the fifth embodiment, when scanning the pixel data of each horizontal scan line included in the limited area LA, it is good enough to scan substantially the other radial side (left side) portion of each horizontal scan line included in the limited area LA with respect to the center C of the field of view F. That is, the scan of the remaining right portion of each horizontal scan line is unnecessary in step S61 of FIG. 21.

Figure 21:
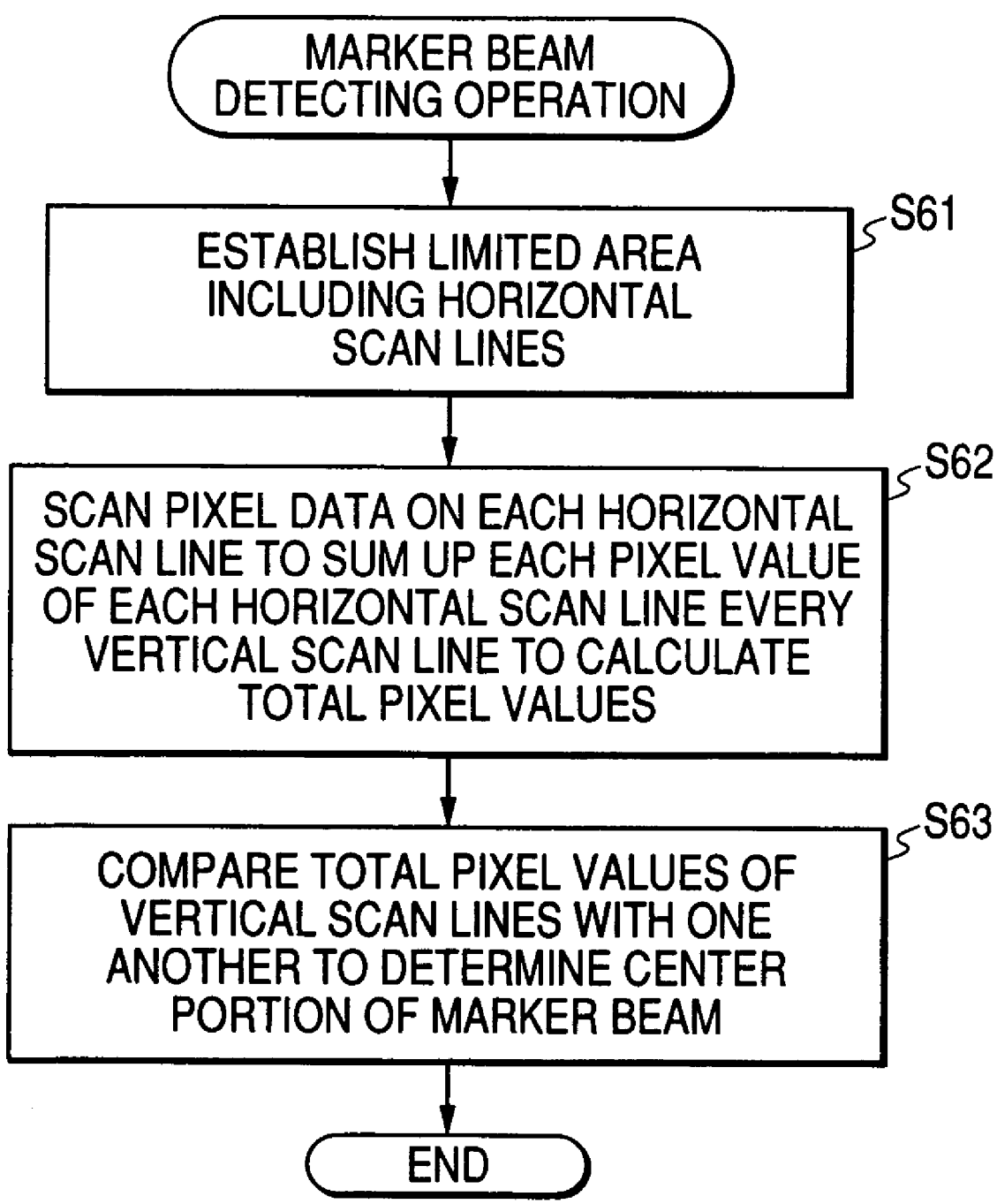
FIG. 21 is a flowchart illustrating marker beam detecting operations of the control circuit in step S33 shown in FIG. 12 according to the fifth embodiment.

In addition, the control circuit 16 scans the pixel data on each of the horizontal scan lines included in the limited area LA to sum up the pixel values of the horizontal scan lines every vertical scan line in the limited area LA, thereby obtaining total pixel values of the vertical scan lines included in the limited area LA, respectively in step S62 in FIG. 21). Incidentally, the control circuit 16 can average the pixel values of the horizontal scan lines every vertical scan line in the limited area LA, thereby obtaining average pixel values of the vertical scan lines included in the limited area LA, respectively.

Figure 20B:
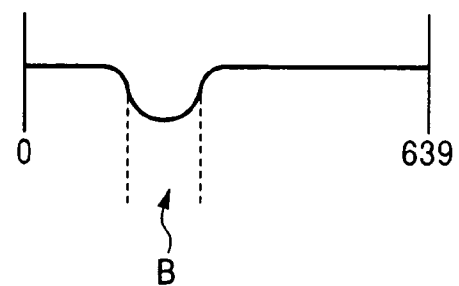
FIG. 20B is a view schematically illustrating a limited area determined on the image data according to the fifth embodiment.

Subsequently, the control circuit 16 compares the total pixel values (average pixel values) of the vertical scan lines with one another to determine a block B of some continuous vertical scan lines whose total pixel values decrease as compared with those of the remaining vertical scan lines (see FIG. 20B). The control circuit 16 identifies a center position (pixel) of the block B as the center portion of the marker beam M30, corresponding to the intermediate portion of the interval G of the marker beam M30 in step S63.

After the identification, the control circuit 16 determines the shift length x30 between the identified center portion of the marker beam M30 along the horizontal direction and the center C of the field of view F; determines the reading distance L between the reading window 1c and the target R based on the determined shift length x30 (see steps S34 and S35 of FIG. 12).

Subsequently, the control circuit 16 determines a suitable focal point matched with the determined reading distance L. Furthermore, the control circuit 16 causes the focal point variable mechanism 33 to shift at least one of the lens elements along the optical axis O at a position matched with the determined focal point in step S36. After adjusting the focal point, the control circuit 16 controls the light illuminating devices 5, the photodetector 3, and the like to pick up an image of the two-dimensional code of the target R on which the illuminating light is being irradiated. As a result, the image of the two-dimensional code Q is picked up by the photodetector 3.

As described above, in the fifth embodiment, similar to each of the third and fourth embodiments, scanning the horizontal scan lines included in the limited area LA allows the position of the intermediate portion of the interval G of the marker beam M30 to be detected. This makes it possible to reduce the time required to detect the marker beam M30. Especially, in the fifth embodiment, it is possible to adjust the focal point of the imaging lens 31 depending on the determined reading distance L. This allows the two-dimensional code Q to be well read out.

Incidentally, the present invention is not limited to each of the first to fifth embodiments so that various expansions and modifications can be made within the scope of the present invention.

That is, in each of the first to fifth embodiments, the apparatus according to the present invention is applied to optical readout of the two-dimensional code Q, such as QR code, but the present invention is not limited to the application. The present invention can be applied to optical readout of another types of two-dimensional codes and/or one-dimensional codes, such as barcodes. When reading out a one-dimensional code, such as a barcode, written on a target, after the marker beam image is firstly picked up, detection of the irradiated position of the marker beam and decoding of the one-dimensional code is performed, respectively, based on the picked-up image. Specifically, while the marker beam is being irradiated on part of the one-dimensional code of the target, after the detection of the irradiation portion based on the picked up marker beam image, the remaining part of the one-dimensional code can be read out along its horizontal scan lines to be decoded, which is similar to each of the first to third embodiments.

In each of the first to fifth embodiments, the determined reading distance L between the reading window 1c and the target R is used to at least one of:

determination of whether the reading distance L is suitable for reading out the target R adjustment of the shutter speed adjustment of the focal point of the imaging lens by the focal point variable mechanism.

In the present invention, assuming that each of the light illuminating devices makes the intensity (light intensity) of the illuminating light variable, each of the illuminating device and/or the control circuit can adjust the intensity of each of the illuminating devices based on the determined reading distance L. For, example, each of the illuminating device and/or the control circuit can adjust that, the farer the determined reading distance L is, the higher the intensity of the illuminating light from each of the illuminating device is. This makes it possible to well read out the two-dimensional code.

In each of the first to third embodiments, the marker beam irradiating device 6 continuously irradiates the marker beam M except when reading out the target R by the photodetector 3, but the present invention is not limited to the structure.

For example, the trigger switch can be designed to allow a user to push it in two strokes (first and second strokes).

In this modification, when the user pushes the trigger switch in the first stroke, such as in half stroke, the command to irradiate the marker beam can be sent to the control circuit 16 so that the control circuit 16 can control the marker beam irradiating device to irradiate the marker beam.

In addition, when the user pushes the trigger switch in the second stroke, such as in full stroke, the instruction to perform the picking up operation of the image can be sent to the control circuit 16, which may allow the control circuit 16 to execute the image picking up operations.

The configuration of the marker beam M can be modified. For example, the marker beam may consist of a center beam component arranged at the center of its marker beam irradiated area and three pointed beam components surrounding, for example, at equal distances, the center beam component constituting the periphery of the marker beam irradiated area. The marker beam may consist of L-shaped four corner beam components constituting the four corner portions of its marker beam irradiated area. The marker beam irradiating device may make the marker beam blink.

In the third embodiment, the control circuit 16 scans each pixel along the left-upside direction with respect to the center C of the field of view P to detect the dot-shaped beam component of the marker beam M12.

When the marker beam consists of one or more dot-shaped beam components, the control circuit 16 can scan one of each vertical scan line and each horizontal scan line to detect a local maximum position in one of each vertical scan line and each horizontal scan line, which has an intensity, in other words, an amplitude that exceeds a predetermined value.

The control circuit 16 can temporarily set, as a temporal marker position, the local maximum position in one of each vertical line and each horizontal line. The control circuit 16 can scan the other of the vertical scan line and the horizontal scan line, which passes through each of the temporal marker positions, to detect a local maximum position in the other of the vertical and horizontal scan lines, which has an intensity (amplitude) that exceeds a predetermined value.

Subsequently, the control circuit 16 can determine whether the local maximum position of the other of the vertical and horizontal scan lines substantially coincides with the temporal marker position. When determining that the local maximum position of the other of the vertical and horizontal scan lines substantially coincides with the temporal marker position, the control circuit 16 can recognize the determined local maximum position that coincides with the temporal marker position as the irradiated position of the marker beam on the target. In this modification, the scan can be determined on both the limited horizontal and vertical scan lines, making it possible to certainly detect the irradiated position of the dot-shaped marker beam on the target in short time.

In this modification, when determining a plurality of local maximum positions each having the intensity or amplitude exceeding a predetermined value in the same horizontal or vertical scan line, some of the local maximum positions can be used in descending order of the intensity or amplifier. This prevents another marker beam from being detected as much as possible, making it possible to further certainly detect the irradiated position of the dot-shaped marker beam on the target.

In place of detecting the center of the marker beam as the irradiation position of the marker beam on the target, it is possible to detect a predetermined position in the marker beam and/or an interval between predetermined positions. Incidentally, in each of the first to fifth embodiments, when recognizing no marker beam, the control circuit can determine that the distance between the reading window and the target is too far to lack the amount of light reflected from the target.

In each of the first to fifth embodiments, the present invention is applied to a gun-shaped two-dimensional code reader, but the present invention is not limited to the structure of each of the first to fifth embodiments. That is, an optical information reader according to the present invention may have a handheld structure. In addition, an optical information reader according to the present invention may be previously installed in a system such as FA (Factory Automation) System. Notice means for sending a notice to a user is not limited to the structure shown in each of the first to fifth embodiments, and various types of notice units can be applied.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. An apparatus for optically reading out through an imaging optics a first image of information by a photodetector, the information being attached to a target, the apparatus comprising:
   a marker beam irradiating unit configured to irradiate on the target a marker beam for indicating a field of view of the photodetector on the target;
   a first pickup unit configured to cause the photodetector to pick up through the imaging optics a second image of the target based on the field of view while the marker beam is being irradiated on the target by the marker beam irradiating device;
   a position detecting unit configured to detect a position of the marker beam being irradiated on the target with respect to the field of view based on the picked-up second image; and
   a distance determining unit configured to determine a distance between the apparatus and the target based on the detected position of the marker beam.

2. An apparatus for optically reading out through an imaging optics a first image of information by a photodetector, the information being attached to a target, the apparatus comprising:
   a marker beam irradiating unit configured to irradiate on the target a marker beam for indicating a field of view of the photodetector on the target;
   a first pickup unit configured to cause the photodetector to pick up through the imaging optics a second image of the target based on the field of view while the marker beam is being irradiated on the target by the marker beam irradiating device;
   a position detecting unit configured to detect a position of the marker beam being irradiated on the target with respect to the field of view based on the picked-up second image; and
   a distance determining unit configured to determine a distance between the apparatus and the target based on the detected position of the marker beam,
   wherein an optical axis of the marker beam irradiated by the marker beam irradiating unit is designed to cross with that of the imaging optics.

3. An apparatus for optically reading out through an imaging optics a first image of information by a photodetector, the information being attached to a target, the apparatus comprising:
- a marker beam irradiating unit configured to irradiate on the target a marker beam for indicating a field of view of the photodetector on the target;
- a first pickup unit configured to cause the photodetector to pick up through the imaging optics a second image of the target based on the field of view while the marker beam is being irradiated on the target by the marker beam irradiating device;
- a position detecting unit configured to detect a position of the marker beam being irradiated on the target with respect to the field of view based on the picked-up second image; and
- a distance determining unit configured to determine a distance between the apparatus and the target based on the detected position of the marker beam,
- wherein an optical axis of the marker beam irradiated by the marker beam irradiating unit is designed to be parallel to that of the imaging optics.

4. An apparatus for optically reading out through an imaging optics a first image of information by a photodetector, the information being attached to a target, the apparatus comprising:
- a marker beam irradiating unit configured to irradiate on the target a marker beam for indicating a field of view of the photodetector on the target;
- a first pickup unit configured to cause the photodetector to pick up through the imaging optics a second image of the target based on the field of view while the marker beam is being irradiated on the target by the marker beam irradiating device;
- a position detecting unit configured to detect a position of the marker beam being irradiated on the target with respect to the field of view based on the picked-up second image;
- a distance determining unit configured to determine a distance between the apparatus and the target based on the detected position of the marker beam; and
- a storing unit configured to store relation data indicative of a relationship between at least one first value assigned to the position of the marker beam on the target and at least one second value of the distance between the apparatus and the target, the at least one second value of the distance depending on the at least one first value,
- wherein the distance determining unit is configured to determine the distance between the apparatus and the target based on the relation data and the detected position of the marker beam on the target.

5. An apparatus for optically reading out through an imaging optics a first image of information by a photodetector, the information being attached to a target, the apparatus comprising:
- a marker beam irradiating unit configured to irradiate on the target a marker beam for indicating a field of view of the photodetector on the target;
- a first pickup unit configured to cause the photodetector to pick up through the imaging optics a second image of the target based on the field of view while the marker beam is being irradiated on the target by the marker beam irradiating device;
- a position detecting unit configured to detect a position of the marker beam being irradiated on the target with respect to the field of view based on the picked-up second image;
- a distance determining unit configured to determine a distance between the apparatus and the target based on the detected position of the marker beam; and
- a second pickup unit configured to cause the photodetector to pick up through the imaging optics the first image of the information based on the field of view while keeping the marker beam off after the pickup of the second image.

6. An apparatus for optically reading out through an imaging optics a first image of information by a photodetector, the information being attached to a target, the apparatus comprising:
- a marker beam irradiating unit configured to irradiate on the target a marker beam for indicating a field of view of the photodetector on the target;
- a first pickup unit configured to cause the photodetector to pick up through the imaging optics a second image of the target based on the field of view while the marker beam is being irradiated on the target by the marker beam irradiating device;
- a position detecting unit configured to detect a position of the marker beam being irradiated on the target with respect to the field of view based on the picked-up second image;
- a distance determining unit configured to determine a distance between the apparatus and the target based on the detected position of the marker beam; and
- a decoding unit configured to generate the first image of the information based on the second image picked up by the first pickup unit to decode the information based on the first image.

7. An apparatus for optically reading out through an imaging optics a first image of information by a photodetector, the information being attached to a target, the apparatus comprising:
- a marker beam irradiating unit configured to irradiate on the target a marker beam for indicating a field of view of the photodetector on the target;
- a first pickup unit configured to cause the photodetector to pick up through the imaging optics a second image of the target based on the field of view while the marker beam is being irradiated on the target by the marker beam irradiating device;
- a position detecting unit configured to detect a position of the marker beam being irradiated on the target with respect to the field of view based on the picked-up second image;
- a distance determining unit configured to determine a distance between the apparatus and the target based on the detected position of the marker beam; and
- a determining unit configured to determine whether the determined distance is within a predetermined range and, when determining that the determined distance is out of the predetermined range, to send a notice representing that the determined distance is out of the predetermined range.

8. An apparatus for optically reading out through an imaging optics a first image of information by a photodetector, the information being attached to a target, the apparatus comprising:
- a marker beam irradiating unit configured to irradiate on the target a marker beam for indicating a field of view of the photodetector on the target;
- a first pickup unit configured to cause the photodetector to pick up through the imaging optics a second image of the target based on the field of view while the marker beam is being irradiated on the target by the marker beam irradiating device;

a position detecting unit configured to detect a position of the marker beam being irradiated on the target with respect to the field of view based on the picked-up second image;

a distance determining unit configured to determine a distance between the apparatus and the target based on the detected position of the marker beam; and a focal point adjusting unit configured to automatically adjust a focal point of the imaging optics based on the determined distance between the apparatus and the target.

9. An apparatus for optically reading out through an imaging optics a first image of information by a photodetector, the information being attached to a target, the apparatus comprising:

a marker beam irradiating unit configured to irradiate on the target a marker beam for indicating a field of view of the photodetector on the target;

a first pickup unit configured to cause the photodetector to pick up through the imaging optics a second image of the target based on the field of view while the marker beam is being irradiated on the target by the marker beam irradiating device;

a position detecting unit configured to detect a position of the marker beam being irradiated on the target with respect to the field of view based on the picked-up second image; and a distance determining unit configured to determine a distance between the apparatus and the target based on the detected position of the marker beam, wherein the marker beam comprises a plurality of beam components each having a predetermined configuration, the marker beam irradiating unit is so arranged as to have a predetermined orientation with respect to the imaging optics, the photodetector has a light sensitive area composed of a plurality of horizontal and vertical scan lines so that each of the first and second image comprises intensity in each of the vertical and horizontal lines, and the position detecting unit is configured to:

establish a limited scan region in the second image; and scan the intensity in each of the vertical and horizontal lines in the limited scan region in the second image to detect the position of the marker beam based on the scanned result.

10. An apparatus according to claim 9, wherein the marker beam comprises a plurality of dot-shaped beams, and the position detecting unit is configured to:

scan one of each vertical scan line and each horizontal scan line included in the limited scan region in the second image to detect one or more first local maximum positions in one of each vertical scan line and each horizontal scan line, each first local maximum position having the intensity that exceeds a first predetermined value, each first local maximum position in one of each vertical scan line and each horizontal scan line being referred to as a temporal marker position;

scan the other of the vertical scan line and the horizontal scan line, which passes through each of the temporal marker positions, so as to detect a second local maximum position in the other of the vertical and horizontal scan lines, the second local maximum position having an the intensity that exceeds a second predetermined value;

compare the first local maximum position with the second local maximum position; and when the first local maximum position substantially coincides with the second local maximum position based on the compared result, recognize the second local maximum position coinciding with the first local maximum position as the position of the marker beam on the target.

11. An apparatus according to claim 10, wherein, when determining the first local maximum positions each having the intensity exceeding the first predetermined value in at least one of the same horizontal scan line and the same vertical scan line, the position detecting unit is configured to use some the first local maximum positions in descending order of the intensity.

12. An apparatus according to claim 9, wherein the marker beam comprises a linear beam component extending in parallel to one of each vertical scan line and each horizontal scan line of the second image, and the position detecting unit is configured to:

scan one of each vertical scan line and each horizontal scan line, which is orthogonal to the extending direction of the linear beam component, included in the limited scan region in the second image to detect one or more first local maximum position in one of each vertical scan line and each horizontal scan line, the first local maximum position having the intensity that exceeds a first predetermined value, the first local maximum position in one of each vertical scan line and each horizontal scan line being referred to as a temporal marker position; and find the other of the vertical scan line and the horizontal scan line, which passes through each of the temporal marker positions to recognize the other of the vertical scan line and the horizontal scan line as the position of the marker beam on the target.

13. An apparatus according to claim 9, wherein the marker beam comprises first and second linear beam components crossed to each other, and the position detecting unit is configured to individually identify a position of the first linear beam component and that of the second linear beam component to calculate an intersection position between the first and second linear beam components in the second image as the position of the marker beam based on the identified positions of the first linear beam component and the second linear beam component.

14. An apparatus according to claim 9, wherein the marker beam comprises first and second linear beam components horizontally parallely extend in line with an interval therebetween, and the position detecting unit is configured to:

scan the vertical scan lines, which are orthogonal to the extending direction of the each of the first and second linear beam components, included in the limited scan region in the second image;

detect the interval between the first and second linear beam components based on the scanned result; and recognize a center position of the detected interval as the position of the marker beam in the second image.

15. An apparatus according to claim 14, wherein the position detecting unit is configured to:

establish, as the limited scan region, continuous horizontal scan lines including the first and second linear beam components;

execute a sum of the intensities of the horizontal scan lines included in the continuous horizontal lines every vertical scan line to obtain a total intensity of each of the vertical scan lines included in the continuous horizontal scan lines; and detect the interval of the first and second linear beam components based on the total intensity of each of the vertical scan lines.

16. An apparatus according to claim 14, wherein the position detecting unit is configured to:
- establish, as the limited scan region, continuous horizontal scan lines including the first and second linear beam components;
- average the intensities of the horizontal scan lines included in the continuous horizontal lines every vertical scan line to obtain an average intensity of each of the vertical scan lines included in the continuous horizontal scan lines; and
- detect the interval of the first and second linear beam components based on the average intensity of each of the vertical scan lines.

17. An apparatus according to claim 9, wherein the marker beam irradiating unit is radially arranged with respect to the optical axis of the imaging optics, and the position detecting unit is configured to scan the second image from a center thereof along a radial direction defined by the orientation between the marker beam irradiating unit and the imaging optics, thereby detecting the position of the marker beam in the second image.

18. A method of optically reading out a first image of information based on a predetermined field of view of an apparatus, the information being attached to a target, the method comprising:
- irradiating on a target a marker beam for indicating the field of view on the target;
- picking up a second image of the target based on the field of view while the marker beam is being irradiated on the target by the irradiating;
- detecting a position of the marker beam being irradiated on the target with respect to the field of view based on the picked-up second image; and
- determining a distance between the apparatus and the target based on the detected position of the marker beam.

* * * * *